(12) United States Patent
Ghosh et al.

(10) Patent No.: US 9,055,000 B1
(45) Date of Patent: *Jun. 9, 2015

(54) DISTRIBUTED NETWORK SUBNET

(71) Applicant: Juniper Networks, Inc., Sunnyvale, CA (US)

(72) Inventors: Kaushik Ghosh, Sunnyvale, CA (US); Ramasamy Ramanathan, Santa Clara, CA (US); Anil Lohiya, Cupertino, CA (US); Manoj Sharma, Cupertino, CA (US); Shrinivasa Kini, Santa Clara, CA (US); Cunzhi Lu, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/717,533

(22) Filed: Dec. 17, 2012

(51) Int. Cl.
*H04L 12/56* (2006.01)
*H04L 12/721* (2013.01)

(52) U.S. Cl.
CPC .................................... *H04L 45/66* (2013.01)

(58) Field of Classification Search
CPC .................................................. H04I 12/4641
USPC ........................................................ 370/392
See application file for complete search history.

(56) References Cited

U.S. PATENT DOCUMENTS 7,856,024 B1 * 12/2010 Karuppiah et al. ........... 370/401
2012/0033541 A1 * 2/2012 Jacob Da Silva et al. .... 370/217

OTHER PUBLICATIONS

"Implementing VPLS in Data Center Networks," Juniper Networks Inc., Oct. 2005, 47 pp.
"Ethernet Switching Features on the QFX Series," Juniper Networks Inc., Apr. 17, 2012, 370 pp.
"Cloud-Ready Data Center Reference Architecture," Juniper Networks Inc., Feb. 2011, 37 pp.
"Infrastructure for Enterprise Data Centers," Juniper Networks Inc., Apr. 2012, 5 pp.
U.S. Appl. No. 13/156,214, by Ramasamy Ramanathan, filed Jun. 8, 2012.

* cited by examiner

*Primary Examiner* — Man Phan
*Assistant Examiner* — Mewale Ambaye
(74) *Attorney, Agent, or Firm* — Shumaker & Sieffert, P.A.

(57) ABSTRACT

In general, techniques for facilitating a distributed network (L3) subnet by which multiple independent control planes of network devices connected to physically separate L2 networks provide L2 reachability to/from a single L3 subnet. In some examples, a shared L2 network physically situated to connect a plurality of physically separate L2 networks "stitches" the L2 networks together within the respective, independent control planes of switches such that the control planes bridge L2 traffic for a single bridge domain for the separate L2 networks to the shared L2 network and visa-versa. Each of the independent control planes may be configured with a virtual IRB instance associated with the bridge domain and with a common network subnet. Each of the virtual IRBs provides a functionally similar routing interface for the single bridge domain for the separate L2 networks and allows the shared network subnet to be distributed among the independent control planes.

34 Claims, 12 Drawing Sheets

90

| TYPE (92A) | VALUES (92B) | |
|---|---|---|
| PING | { SRC: P1, DST: P2, ID: 14, SQN: 34856} | 82A |
| PING | { SRC: P3, DST: P2, ID: 65, SQN: 958} | 82B |
| TRACERT | { SRC: P3, DST: P6, SRC PORT: 5123, DST PORT: 612, PROTOCOL: UDP} | 82C |
| ⋮ | ⋮ | |
| * | * | 82N |

FIG. 4

DISTRIBUTED NETWORK SUBNET

TECHNICAL FIELD

The invention relates to computer networks and, more specifically, to network routing and bridging.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers) are connected by one or more Ethernet switches or other L2 network devices. Ethernet networks are commonly referred to as "Ethernet Local Area Networks (LANs)," or more simply as "LANs." The Ethernet switches forward Ethernet frames, also referred to as L2 communications or L2 frames to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically multicasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

Some layer three (L3) networks that route communications at the third layer of the Open Systems Interconnection (OSI) reference model, i.e., the network layer, employ L3 network devices that also perform L2 functionality to bridge and switch L2 communications to other L3/L2 and L2 network devices within the networks. In many instances, a physical LAN is partitioned into distinct broadcast domains by configuring L3/L2 and L2 network devices connected to the LAN to associate end hosts with one or more of the partitions, known as Virtual LANs (VLANs). VLAN tagging (IEEE 802.1Q) is a technique for implementing VLANs by adding a VLAN identifier (or "VLAN tag") to L2 frames that identify the L2 frame as belonging to the identified VLAN.

A bridge domain is a set of physical or logical interfaces of one or more devices that share the same flooding or broadcast characteristics. For a bridge domain of an L2/L3 device (e.g., a router) that is configured with a single VLAN identifier, an integrated routing and bridging (IRB) interface (or "IRB") may be further configured within the router to act as an L3 routing interface for the bridge domain associated with the VLAN identifier. An IRB includes a routing interface for an IRB subnet as well as the bridge domain and thus facilitates simultaneous L2 bridging and L3 routing from the bridge domain. The IRB subnet is effectively a subnet for the bridging domain associated with the VLAN identifier. A router having a configured IRB switches or routes Internet Protocol (IP) packets arriving at the IRB of the bridge domain based on the destination MAC address. The router forwards those frames addressed to a gateway MAC address (i.e., a MAC address for the router) to other L3 interfaces of the router. Contrariwise, for those frames addressed to a MAC address other than the gateway MAC address, the router forwards the frames to a different L2 interface in the bridge domain of the IRB.

SUMMARY

In general, techniques for facilitating a distributed network (L3) subnet by which multiple independent control planes of network devices connected to physically separate L2 networks provide L2 reachability to/from a single L3 subnet. In some examples, a shared L2 network physically situated to connect a plurality of physically separate L2 networks "stitches" the L2 networks together within the respective, independent control planes of switches (or, e.g., virtual switch instances of a router) such that the control planes bridge L2 traffic for a single bridge domain for the separate L2 networks to the shared L2 network and visa-versa. Each of the independent control planes may be configured to establish a modified integrated routing and bridging (IRB) interface instance (hereinafter "virtual IRB" or "VIRB") associated with the single bridge domain and additionally associated with a common network subnet (e.g., an IPv4 or IPv6 subnet). A central allocator allocates a shared gateway MAC address to each of the virtual IRBs. Consequently, each of the virtual IRBs provides a functionally similar routing interface for the single bridge domain for the separate L2 network and allows the common network subnet to be distributed among the independent control planes. As a result, the bridging domain corresponding to the L2 reachability on the separate L2 networks may extend to each of the multiple independent control planes, and L3 hosts belonging to the distributed network subnet may migrate seamlessly among the separate L2 networks. The multiple virtual IRBs of the independent control planes may therefore be conceptualized as a single, overall virtual IRB.

Further, the techniques may ensure that the failure of any network device configured with one of the virtual IRBs for the bridge domain affects only local L2 interfaces of the network device. Such failure does not necessarily prevent the continued operation of the remaining subdomains of the bridge domain and the corresponding routing domain, for the L3 routing domain is collectively owned by multiple independent control planes of separate network devices.

Because the network subnet is distributed among multiple independent control planes of separate network devices, no single network device is solely responsible for assuring reachability and responding to signaling messages relevant to the distributed network subnet. In some examples, therefore, the independent network devices may extend conventional protocols to assure reliable and consistent operations. For instance, network devices may modify the Address Resolution Protocol (ARP) exchange such that a network device participating in a virtual IRB sends a single copy of the ARP request to each other participating network device, which then independently broadcast the ARP request to their respective sub-domains of the bridge domain. In addition, network devices ensure that a copy of the ARP reply for each ARP request is received by each of the network devices. As another example, the network devices participating in the virtual IRB may extend application-layer (i.e., Layer 7) protocol (e.g., Ping and Traceroute) communications in order that each such network device, when it originates an application-layer request, stores a unique record for the application-layer request. When any of the participating network devices receives an application-layer response, if the network device does not store the unique record for the corresponding application-layer request, the network device floods the application-layer response to the other participating network devices, for the network device did not originate the application-layer request and therefore should not process the corresponding application-layer reply. As a result, the network device responsible for the application-layer request is assured of receipt of the corresponding application-layer reply despite sharing responsibility for the distributed network subnet of the virtual IRB with other network devices.

In one aspect, a method includes establishing, within a first network device, a first virtual integrated routing and bridging (VIRB) interface that comprises a first routing interface for a first layer two (L2) bridge domain that provides L2 connectivity for a first network local to the first network device, wherein the first routing interface is associated with a network subnet for the first network. The method also includes establishing, within a second network device, a second VIRB interface that comprises a second routing interface for a second L2 bridge domain that provides L2 connectivity for a second network local to the second network device, wherein the second routing interface is associated with a network subnet for the second network, wherein the first network is not local to the second network device and the second network is not local to the first network device, wherein the network subnet for the first network and the network subnet for the second network comprise a distributed network subnet in which the network subnet for the first network and the network subnet for the second network comprise a common network subnet, and wherein the first VIRB interface and the second VIRB interface have a common gateway MAC address that identifies routable L2 traffic received by the first VIRB interface from the first L2 bridge domain or received by the second VIRB interface from the second L2 bridge domain. The method further includes receiving first L2 traffic with the first network device from the first L2 bridge domain and forwarding L3 traffic encapsulated by the first L2 traffic by the first routing interface when the first L2 traffic is destined for the common gateway MAC address. The method also includes receiving second L2 traffic with the second network device from the second L2 bridge domain and forwarding L3 traffic encapsulated by the second L2 traffic by the second routing interface when the second L2 traffic is destined for the common gateway MAC address.

In another aspect, a network device includes a control unit comprising a processor. A virtual integrated routing and bridging (VIRB) interface of the control unit that comprises a routing interface for a layer two (L2) bridge domain that provides L2 connectivity for a network local to the network device, wherein the routing interface is associated with a distributed network subnet for the network. One or more control processes of the control unit to receive a VIRB MAC message comprising a VIRB MAC address from a central allocator and install the VIRB MAC address as a gateway MAC address for the VIRB interface, wherein the VIRB interface and a VIRB interface of a remote network device have an common gateway MAC address that identifies routable L2 traffic received by the VIRB interface from the L2 bridge domain, and wherein the network device and the remote network device co-own the distributed network subnet, wherein the VIRB interface receives L2 traffic from the L2 bridge domain and forwards L3 traffic encapsulated by the L2 traffic on the routing interface when the L2 traffic is destined for the common gateway MAC address.

In another aspect, a non-transitory computer-readable medium comprises instructions for causing one or more programmable processors to establish, with a network device, a virtual integrated routing and bridging (VIRB) interface that comprises a routing interface for a layer two (L2) bridge domain that provides L2 connectivity for a network local to the network device, wherein the routing interface is associated with a distributed network subnet for the network. The instructions further cause the programmable processors to receive a VIRB MAC message comprising a VIRB MAC address from a central allocator and install the VIRB MAC address as a gateway MAC address for the VIRB interface, wherein the VIRB interface and a VIRB interface of a remote network device have an common gateway MAC address that identifies routable L2 traffic received by the VIRB interface from the L2 bridge domain, and wherein the network device and the remote network device co-own the distributed network subnet. The instructions further cause the programmable processors to receive L2 traffic with the network device from the L2 bridge domain and forward L3 traffic encapsulated by the L2 traffic on the routing interface when the L2 traffic is destined for the common gateway MAC address.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is an example data structure of a network device that stores application records for matching application request/reply exchanges in accordance with techniques described in this disclosure.

Like reference characters denote like elements throughout the figures and text.

DETAILED DESCRIPTION

Figure 1:
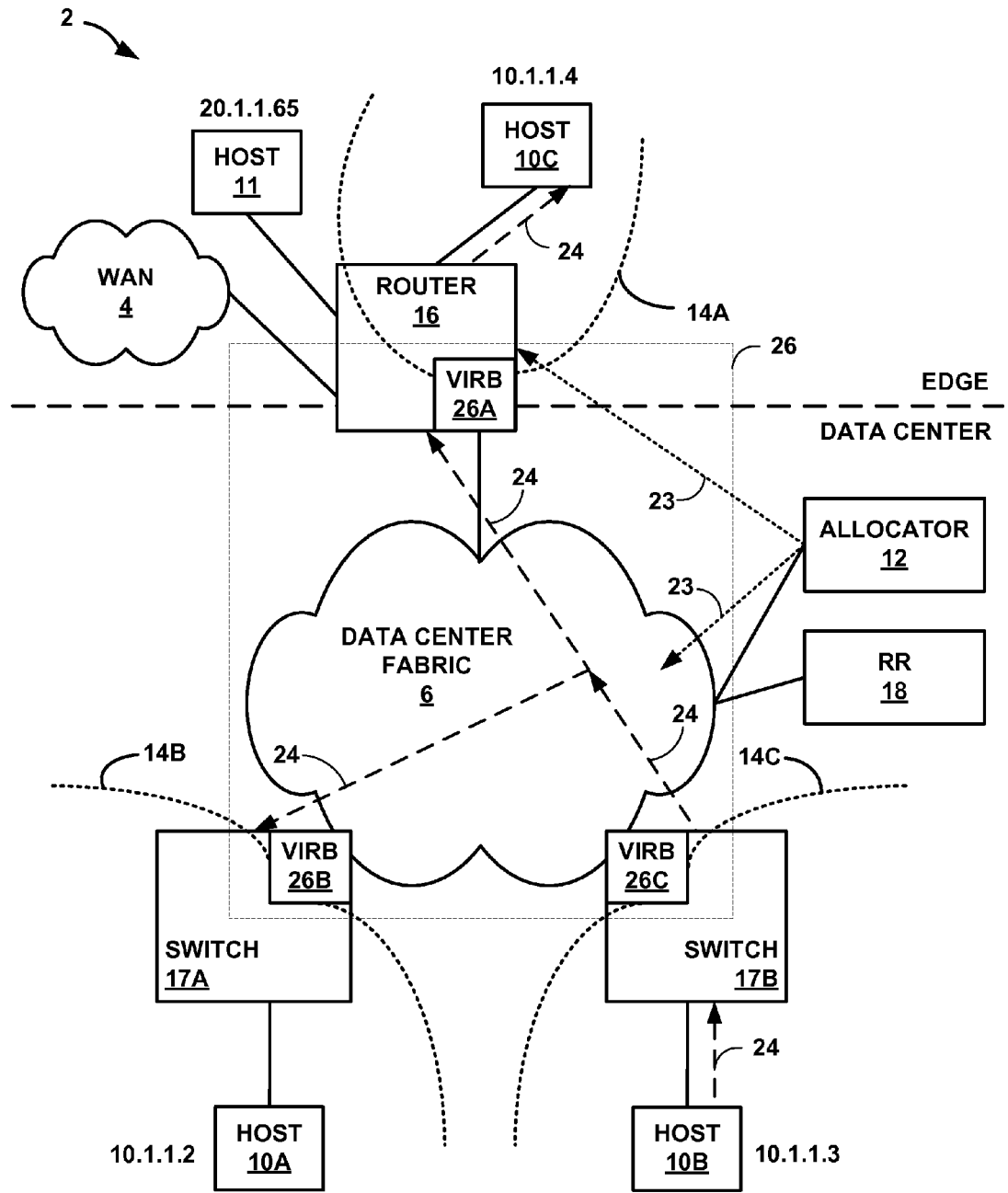
FIG. 1 is a block diagram illustrating an example network system in which independent network devices facilitate a distributed network subnet in accordance with techniques described in this disclosure.

FIG. 1 is a block diagram illustrating an example network system in which independent network devices facilitate a distributed network subnet in accordance with techniques described in this disclosure. Network system 2 illustrates an example architecture for a data center, that is, a specialized facility that provides data serving and backup as well as other network-based services for subscribers and other entities. In this example, router 16 couples data center fabric 6 of the data center to wide area network (WAN) 4 representing one or more end user networks. Router 16 may represent an edge router of a service provider network or a customer edge router of a customer edge network coupled to a service provider network via router 16, for instance. Router 16 is illustrated as constituting as element of the "edge" domain. The edge network may represent a private WAN, campus backbone, mobile access network (e.g., a Long-Term Evolution or 3G network), or Virtual Private Network (VPN), for instance. Router 16 includes one or more communication links with WAN 4, an L2 communication link to host 11, and a layer two (L2) communication link to host 10C. Communication links with WAN 4 may include, for example, layer three (L3) communication links and/or "layer 2.5" communication links such as label switched paths (LSPs) established using one or more of the suite of MultiProtocol Label Switching (MPLS) protocols. Router 16 also includes one or more L2 links to data center fabric 6. The L2 links to data center fabric 6 may be configured on router 16 as a Link Aggregation Group (LAG). In some examples, router 16 has multiple LAGs to data center fabric 6.

Switches 17A, 17B (collectively, "switches 17") provide access to respective hosts 10A, 10B. Each of hosts 10A-10C (collectively, "hosts 10") may represent an enterprise server, application, storage device, virtual machine executing on a server, or any IP or enterprise automation device operating within the data center facility. Each of switches 17 may represent a Top-of-Rack (TOR) switch deployed at the top of a server rack or at the end of a row of server racks. Switches 17 may connect to Fibre Channel over Ethernet (FCoE) networks connected to a Fibre Channel-based Storage Area Network. In such instances, hosts 10B, 10C represent FCoE-capable servers that obtain and sends/serves data stored by storage devices of the Storage Area Network to entities of WAN 4.

Data center fabric 6 provides a fabric for high-speed packet switching among switches 17 and router 16. Data center fabric 6, allocator 12, and route reflector (RR) 18 constitute a core network for the data center domain that provides connectivity from router 16 to hosts 10 and high-speed throughput for data going into or out of the data center. Data center fabric 6 may include one or more high-speed switches and Ethernet/Gigabit Ethernet (GbE) links to interconnect router 16 and switches 17 and access ports thereof. Data center fabric 6 may include one or more Independent Network Entities (INEs). Data center fabric 6 thus includes one or more L2 networks, each L2 network representing a physical Local Area Network (LAN) or a Virtual LAN (VLAN) that is a partition of an underlying physical LAN segmented using, e.g., IEEE 802.1Q. Data center fabric 6 may additionally include one or more TORs, control plane elements such as Independent Network Entities, dedicated control plane switches, and route reflector 18 (illustrated as "RR 18").

Router 16 and switches 17 each provide L3 reachability for a common, distributed network subnet. In other words, router 16 and switches 17 "co-own" the common (or "shared") network subnet and each of router 16 and switches 17 is an access point for a bridge subdomain local to the network device that includes hosts that are members of the shared, distributed network subnet. In the illustrated example, subdomain 14A is local to router 16, and subdomain 14B, 14C are local to switches 17A, 17B, respectively. However, subdomain 14B is not local to either subdomain 14A or subdomain 14C. Collectively, subdomains 14A-14C constitute a single bridge domain for the distributed network subnet. In this example, the distributed network subnet is the IPv4 subnet 10.1.1/24. The distributed network subnet may in some examples represent an IPv6 subnet. By distributing ownership of the network subnet among multiple network devices, L2 bridge and L3 routing domains are extended from router 16 to each of switches 17 such that packets forwarded by switches 17 can reach WAN 4 and/or host 11 by router 16 and, conversely, that packets forwarded by router 16 toward the data center can reach the correct one of switches 17.

Router 16 includes configuration data defining virtual Integrated Routing and Bridging instance (VIRB) 26A. Switches 17A, 17B include configuration data defining respective VIRBs 26B, 26C. Router 16 and switches 17A, 17B establish operational VIRBs 26 in accordance with the configuration data. In some examples, VIRBs 26B, 26C of respective switches 17A, 17B may represent routed VLAN interfaces (RVIs), switch virtual interfaces (SVIs), or bridge-group virtual interfaces (BVIs). VIRBs 26A-26C (collectively, "VIRBs 26") allow seamless integrated routing and bridging for the distributed network subnet shared by subdomains 14A-14C (collectively, "subdomains 14") and co-owned by router 16 and switches 17. Each of VIRBs 26 provides a routing interface for respective bridge subdomains 14 for the corresponding devices. For example, VIRB 26A provides a routing interface for the bridge subdomain 14A. Because the distributed network subnet is shared among router 16 and switches 17, VIRBs 26 are each configured to provide a routing interface for the same network subnet (10.1.1/24 in this example). For each of VIRBs 26, the corresponding bridge domain (i.e., the corresponding one of subdomains 14 of the overall bridge domain) may represent a single VLAN. Consequently, VIRBs 26 may be conceptualized as a single IRB that, although associated with a single bridge domain and routing domain, is distributed among a plurality of separate network devices. In various examples, the respective VLANs of VIRBs 26 may not be different VLANs or the same VLAN.

Configuration data of router 16 and switches 17 defining respective VIRBs 26 may specify that the VIRB is shared among multiple different network devices. In some examples, a dedicated attribute or construct specifies a shared VIRB. For instance, configuration data for router 16 may define the interface for VIRB 26A as follows:

interfaces {
  virb {
    shared-with rvi-vlans;
    unit 0 {
      family inet {
        address 10.1.1.1/24;
}}}}

In the above example, the shared-with attribute specifies to router 16 that virb is shared across the edge domain (in the illustrated example, by router 16) and the data center domain (in the illustrated example, by switches 17). The configuration data further defines the network subnet for virb as 10.1.1/24. The network subnet, along with virb, is distributed among multiple network devices. The new virb device in accordance with techniques described herein may facilitate separation of conventional IRBs and distributed IRBs (e.g., VIRBs 26). Because a router, such as router 16, may by configuration be dynamically transitioned into/out of a shared network subnet relationship with switches 17, the separate constructs may be retained without the need for modification as part of each such transition.

Configuration data of router 16 and switches 17 may situate respective VIRBs 26 as a routing interface for a switch instance having a bridge domain that is shared with another bridge domain. In some examples, a dedicated attribute or construct specifies a shared bridge domain. For instance, configuration data may define a virtual switch for router 16 as follows:

```
routing-instances {
  virtual_switch_0 {
    instance-type virtual-switch;
    bridge-domains bd0 {
      domain-type bridge;
      shared-with blue-12domain-0;
      vlan-id 1700;
      interface ge-12/2/2.1;
      interface ge-1/2/1.1;
      routing-interface virb.0;
}}}
```

In the above configuration data, the virtual switch may be a Virtual Private LAN Service (VPLS) instance or other L2-instance, for example. In addition, the shared-with construct indicates the L2-instance virtual_switch_0 having bridge domain bd0 is shared with a bridge domain blue-12domain-0 for the data center domain. As one example, blue-12domain-0 may refer to a VLAN of data center fabric 6. Consequently, router 16 "stitches" together bd0 and blue-12domain-0 in the control plane using an association to ensure that frames from data center fabric 6 with the blue-12domain-0 context flow through router 16 to sub-domain 14A (or WAN 4 or host 11 in some cases).

Configuration data for router 16 and/or switches 17 may similarly specify a shared routing domain using a dedicated attribute or construct. For instance, configuration data may define an L3 routing instance for router 16 as follows:

```
router-13-with-dcf-0 {
  instance-type vrf;
  shared-with red-13-0;
  interface virb.0;
  interface ge-1/2/1.0;
  interface ge-12/2/2.0;
  route-distinguisher 11.1.1.30:312;
  protocols {
    ospf {
      . . .
    }
}}
```

In the above configuration data, router-13-with-dcf-0 defines an L3 routing instance that includes L3 interface virb.0, which defines VIRB 26A according to the example configuration data above. In addition, the shared-with construct indicates the routing instance is shared with another L3 routing instance, red-13-0, for the data center domain. As one example, red-13-0 may refer to a shared L3 VLAN of data center fabric 6. Consequently, router 16 "stitches" together router-13-with-dcf-0 (including the virb.0 interface) and red-13-0 in the control plane using an association to ensure that packets from data center fabric 6 with the red-13-0 context can flow through router 16 to sub-domain 14A (or WAN 4 or host 11 in some cases).

In this way, router 16 and switches 17 extend the L2 bridge domain and L3 routing domain associated with VIRBs 26 to multiple sub-domains that are local to the respective network devices. As a result, frames/packets forwarded by switches 17 can reach WAN 4 and/or host 11 by router 16 and, conversely, frames/packets forwarded by router 16 toward the data center can reach the correct one of switches 17.

In accordance with techniques described in this disclosure, a central allocation server 12 ("allocator 12") provides the same MAC address to each of router 16 and switches 17 to be used as the gateway MAC address (or "VIRB MAC address") for corresponding VIRBs 26. Allocator 12 may be logically located on a dedicated control plane VLAN of data center fabric 6. The VIRB MAC address may include a virtual MAC address. In this example, allocator 12 issues VIRB MAC message 23 to each of router 16 and switches 17 to publish the VIRB MAC address allocated for VIRBs 26. VIRB MAC message 23 may, for example, represent a Remote Procedure Call (RPC) reply. VIRB MAC message 23 includes the VIRB MAC address allocated by allocator 12 for VIRBs 26. When router 16, for instance, receives VIRB MAC message 23, router 16 extracts and associates the VIRB MAC address with VIRB 26A.

In some examples, the presence in configuration data of an attribute or construct specifying a shared VIRB (shared-with in the above examples) indicates, to the control plane of a network device that includes the configuration data, that the control plane is to confer with allocator 12 to obtain a VIRB MAC address for the shared VIRB. In the example configuration data reproduced above, the shared-with attribute indicates to router 16 that router 16 is to request the VIRB MAC address from allocator 12. Router 16 may, for instance, use an RPC-request to request the VIRB MAC address from allocator 12 over an internal, private routing instance used for control-communication.

Router 16 and switches 17 forward a frame received from the VLAN according to a destination MAC address of the frame. If the frame includes a destination MAC address that is the VIRB MAC address received in VIRB MAC message 23, router 16 and switches 17 forward the frame on an L3 interface using a shared routing instance. If the frame includes a destination MAC address that is not the VIRB MAC address, router 16 and switches 17 forward the frame in the L2 bridge domain of VIRB 26.

ARP resolution occurs in the context of a distributed network subnet with different sub-domains 14 local to respective network devices, router 16 and switches 17. In other words, network addresses must be resolved for cross-domain IRBs (i.e., VIRBs 26), for host 11 on the router 16 side of the distributed subnet as well as hosts 10 on the switch 17 side of the subnet may migrate. That is, host 11 may "move" to the switch 17 side, and hosts 10A, 10B may "move" to the router 16/WAN side. When a host moves in this manner (e.g, virtual machine movement), its default gateway address and its IP address must not change.

In accordance with techniques described herein, router 16 and switches 17 replicate ARP replies received from hosts 10 to one another to publish the respective network devices "behind" which a corresponding one of hosts 10 is situated. For example, host 11 may send a network packet to host 10B having network address 10.1.1.3. Host 11 may in some instances be connected to router by WAN 4 rather than directly to router 16. This may happen when the subnet is distributed across the WAN (described in further detail below with respect FIG. 6), instead of over a router and its directly-attached switch (as illustrated in the example topology shown in FIG. 1). Router 16 identifies VIRB 26A as associated with the network subnet of which host 10B is a member. Router 16 generates an ARP request for the network address of host 10B and sends the ARP request on each of its connected L2 ports for VIRB 26A, including to data center fabric 6 and toward host 10C. Router 16 may send a single copy to data center fabric 6, which replicates the ARP request to each of switches 17, which in turn each replicate the ARP request to hosts 10A, 10B on sub-domains 14B, 14C.

Host 10B receives the ARP request and issues ARP reply 24 including a MAC address for host 10B. Switch 17B installs a forwarding entry for the MAC address for host 10B to an ARP table. In addition, although switch 17B owns the VIRB 26C network subnet, of which host 10B is a member, switch 17B nevertheless forwards a copy of ARP reply 24 to data center fabric 6, for router 16 and switch 17A also own the VIRB network subnet and may be gateways to the host that issued the corresponding ARP request. Data center fabric 6 replicates ARP reply 24 to router 16 and switch 17A. Any of hosts 10 that is a member of the distributed network subnet may be local to (or "behind") any of router 16 and switches 17 and, as a result, router 16 and switches 17 forward packets using individual /32 routes rather than an aggregate route for the network subnet. Consequently, upon receiving ARP reply 24, router 16 and switch 17A install, to an ARP table, a /32 route for the network address of host 10B that maps to an interface toward switch 17B that "owns" host 10B. The /32 route may include a host 10B network address-MAC address bound to an interface to switch 17A (A similar /32 for host 10A would be bound to an interface to router 16.). Router 16 and switch 17A may, as a result, forward L2 traffic on a shared L2 VLAN over data center fabric 6 or forward L3 traffic on a shared L3 VLAN over data center fabric 6 toward switch 17B. In addition, the binding enables router 16 and switches 17 to support virtual machine migration from router 16 to switches 17. The IP address and default router binding for host 10B should be preserved if 10B migrates from a previous location in subdomain 14A to the illustrated location in subdomain 14C.

Because each of router 16 and switches 17 may store <IP, MAC> bindings for hosts 10, the network devices can detect in the data plane when any of hosts 10 migrate to/from router 16 from/to any of switches 17, or migrate between switches 17. For example, if a MAC address of host 10B in a received frame matches an entry in an ARP table of router 16 but the received frame is received on the wrong interface according to the ARP table entry, router 16 modifies the ARP table entry to the new interface (e.g., from an interface for switch 17B to an interface to switch 17A). In addition, router 16 may issue a gratuitous ARP to notify switches 17 that host 10B has migrated. Switches 17 modify their respective ARP tables to point to the correct interface accordingly. In some examples, ARP replies and gratuitous ARPs may be reflected using route reflector 18 of the data center domain, rather than being forwarded on the shared L2 VLAN of data center fabric 6. In some examples, switches 17 and router 16 exchange ARP entries with one another via route reflector 18. In general, an ARP entry includes a network address, MAC address association and may bind the ARP entry to an interface. Switches 17, router 16, and route reflector 18 may exchange ARP entries using Border Gateway Protocol (BGP), for instance. In this way, switches 17 and router 16, having determined that a MAC has moved to an L2 interface associated with the distributed VIRBs 26, re-points L3 routes to the appropriate next hop for the L2 interface.

By allocating and publishing a single VIRB MAC address for use by router 16 and switches 17 as the MAC address for respective VIRBs 26, the techniques of this disclosure may ensure that virtual hosts are able to seamlessly migrate among sub-domains 14, for the destination MAC address to be used for routable frames (i.e., the VIRB MAC address) does not change according to the particular one of sub-domains 14 in which the virtual host is situated. For example, if host 10B that is local to switch 17B (and therefore uses the VIRB MAC address for VIRB 26B for routable frames) migrates to sub-domain 14A local to router 16, host 10B may continue to use the VIRB MAC address, for the VIRB MAC address also identifies routable frames for VIRB 26A and thus the default gateway address for each of VIRBs 26 is the same. Hosts 10 may receive the VIRB MAC address in response to an Address Resolution Protocol (ARP) request for the default gateway address, which may be the network address of VIRBs 26. Router 16 and switches 17 maintain updated ARP entries by communicating detected MAC migration via, e.g., route reflector 18, thus enabling seamless packet forwarding for hosts 10 migrating with the distributed network subnet.

Furthermore, by allocating the VIRB MAC address from a central allocator 12 rather than from router 16, failure by any of the edge domain systems or the data center domain systems need not prevent the continued operation of the other system. For example, as a result of implementing techniques described herein, switches 17 of the data center domain may continue to route and bridge traffic between one another despite a failure of router 16, which contrasts with conventional systems that require forwarding traffic for different bridge domains through router 16 due to conventional Integrated Routing and Bridging (IRB) interfaces being allocated a MAC address from the chassis-private pool of MAC addresses.

Figure 2A:
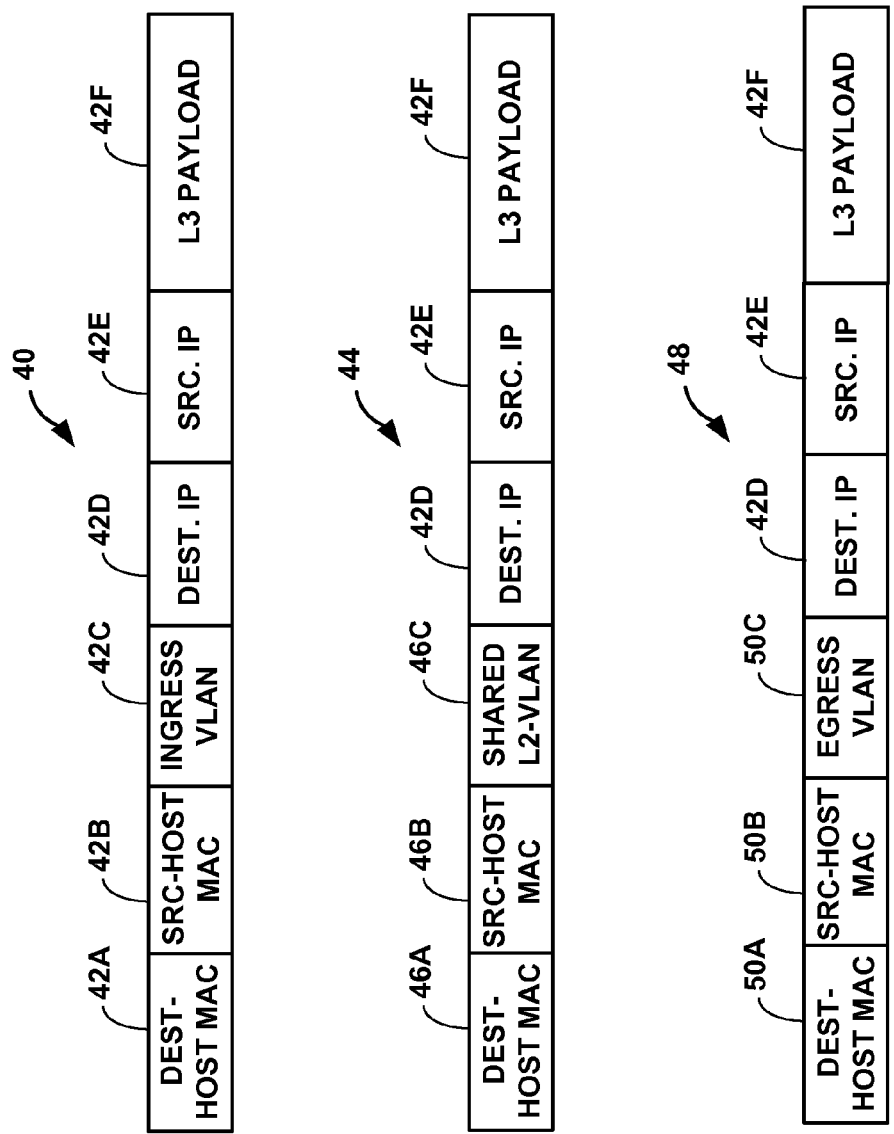
FIGS. 2A-2C depict L2/L3 headers of L2 frames traversing an example network system having an edge router domain and data center fabric domain in accordance with techniques described in this disclosure.
Figure 2B:
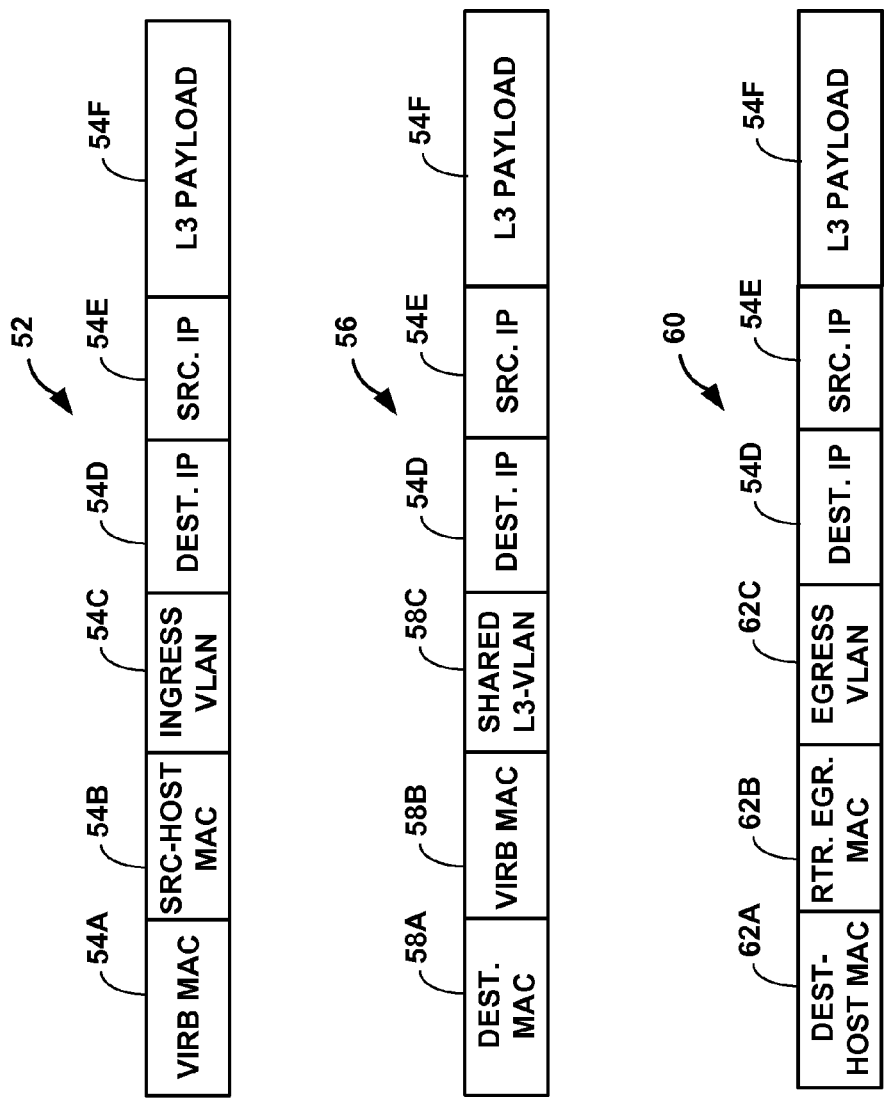
Figure 2C:
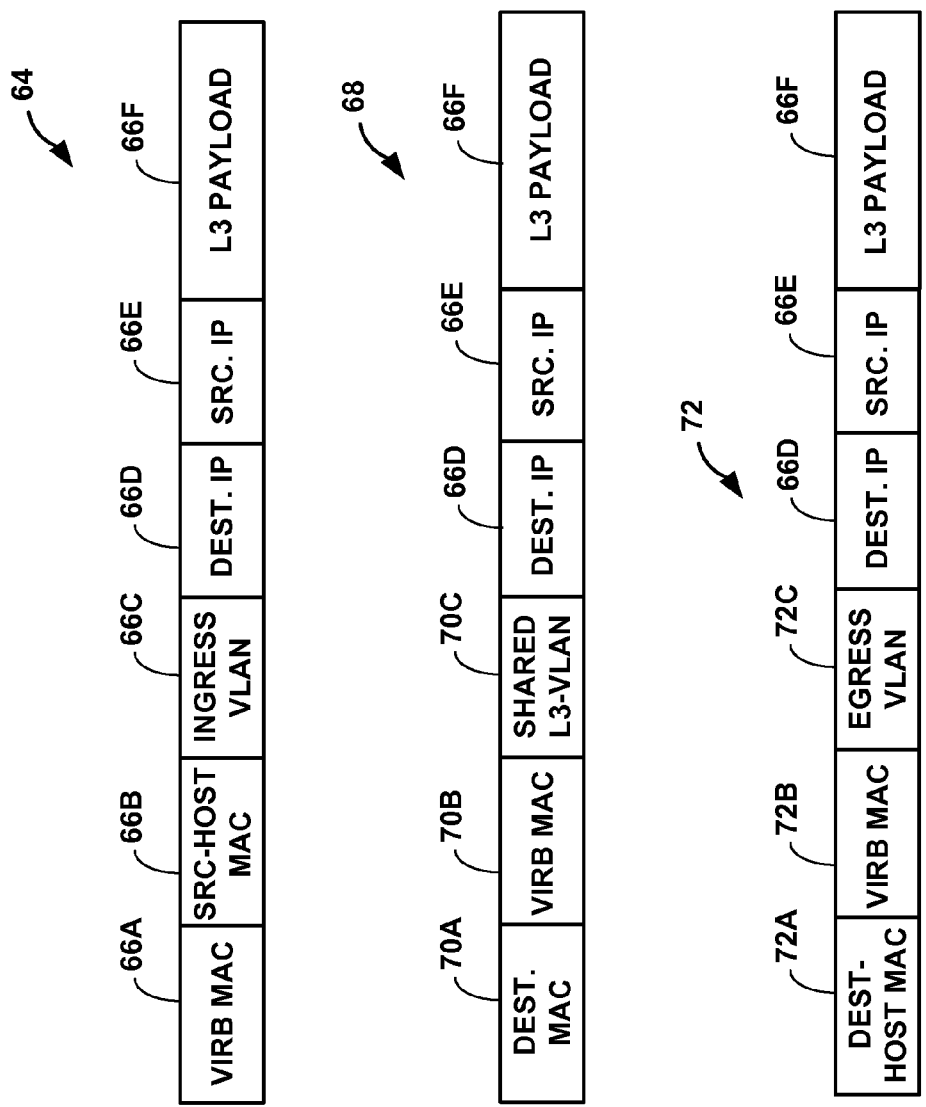

FIGS. 2A-2C depict L2/L3 headers of L2 frames traversing an example network system having an edge router domain and data center fabric domain in accordance with techniques described in this disclosure. The L2 frames are described, for illustrative purposes, within the context of FIG. 1.

FIG. 2A is a block diagram depicting values of a layer two (L2) header encapsulating a layer three (L3) packet being layer two (L2) forwarded over an extended L2 domain according to techniques described herein. In this example, network system 2 of FIG. 1 forwards an L3 packet including an L3 payload 42F and an L3 header including destination IP address 42D and source IP address 42E, and L2 frames 40, 44, and 48 may illustrate transformations of an L2 frame from either of hosts 10A, 10B through switches 17 and router 16 toward WAN 4. Switch 17A, for instance, receives L2 frame 40 at an L2 ingress interface of VIRB 26B. Because the destination host MAC address 42A is not a VIRB MAC address for VIRBs 26, switch 17A bridges L2 frame on the shared L2 VLAN of data center fabric 6 as L2 frame 44 by replacing ingress VLAN 42C with shared L2-VLAN 46C to include the identifier for the shared L2 VLAN and by forwarding L2 frame 44 on an L2 interface toward router 16. Shared L2-VLAN 46C may represent a VLAN tag. In this example, router 16 receives L2 frame 44 on the shared L2 VLAN and bridges L2 frame to the egress VLAN of the VIRB 26A as L2 frame 48 by replacing the shared L2-VLAN 46C with egress VLAN 50C.

FIG. 2B is a block diagram depicting values of a layer two (L2) header encapsulating a layer three (L3) packet being layer three (L3) forwarded over a routing domain extended in accordance with techniques described herein. In this example, network system 2 of FIG. 1 forwards an L3 packet including an L3 payload 54F and an L3 header including destination IP address 54D and source IP address 54E, and L2 frames 52, 56, and 60 may illustrate transformations of an L3 packet sent by either of hosts 10A, 10B through switches 17 and router 16 toward WAN 4. Switch 17A, for instance, receives L2 frame 52 at an L2 ingress interface of VIRB 26B. Because the destination host MAC address 42A is a VIRB MAC address for VIRBs 26, switch 17A L3 forwards the L3 packet with a routing instance that includes VIRB 26B as a routing interface. Specifically, switch 17A L3 forwards, toward router 16, L2 frame 56 including the L3 packet on the shared L3 VLAN of data center 6 for switches 17 and router 16, as indicated by shared L3-VLAN 58C. Router 16 receives L2 frame 56 on the shared L3 VLAN and L3 forwards, in accordance with a route table, the L3 packet as L2 frame 60. Destination host MAC address 62A ("Dest-host MAC 62A") may include a MAC address for a destination host directly connected to router 16 or a MAC address for a next hop router. Router egress MAC address 62B ("Rtr. Egr. MAC 62B") may include the VIRB MAC address for VIRB 26A if destination IP address 54D ("Dest. IP 54D") includes an IP address within the distributed network subnet for VIRB 26A. Router 16 may decrement a time-to-live (TTL) value (not shown) for the L3 packet.

FIG. 2C is a block diagram depicting values of a layer two (L2) header encapsulating a layer three (L3) packet being layer three (L3) forwarded over a routing domain extended in accordance with techniques described herein. In this example, network system 2 of FIG. 1 forwards an L3 packet, including an L3 payload 66F and an L3 header including destination IP address 66D and source IP address 66E, in a North-South direction, i.e., toward a host connected to one of switches 17. That is, L2 frames 64, 68, and 72 may illustrate transformations of an L3 packet from WAN 4 or host 11 through router 16 and switches 17 to either of hosts 10A, 10B. Destination IP address 66D ("dest. IP 66D") includes an IP address within the distributed network subnet of VIRBs 26. Router 16 receives L2 frame 64 at an L2 interface of VIRB 26A. Because the destination host MAC address 66A is a VIRB MAC address for VIRBs 26, router 16 L3 forwards the L3 packet with a routing instance that includes VIRB 26A as a routing interface. In some cases, source host MAC address 66B ("src-host MAC 66B") may be a next hop router MAC address if source IP address 66E ("src. IP 66E") is not a directly connected host. In such cases, VIRB MAC address 66A ("VIRB MAC 66A") may be another MAC address of router 16 that is not the VIRB MAC address of VIRBs 26. In such cases, router 16 nevertheless also forwards the L3 packet using a routing instance that includes VIRB 26A as a routing interface because destination IP address 66D includes an IP address within the distributed network subnet of VIRB 26A. Router 16 may eschew decrementing a time-to-live (TTL) value (not shown) for the L3 packet.

Router 16 L3 forwards, toward switch 17A, L2 frame 68 including the L3 packet on the shared L3 VLAN of data center 6 for switches 17 and router 16, as indicated by shared L3-VLAN 70C. Switch 17A receives L2 frame 72 on the shared L3 VLAN stitched within switch 17A to VIRB 26B. Switch 17A queries an ARP table for destination IP address 66D to obtain the destination host MAC address 72A ("dest-host MAC 72A"). Switch 17A subsequently bridges, to the destination host, L2 frame 72 with destination host MAC address 72A from VIRB MAC address 72B ("VIRB MAC 72B"). Switch 17A may, unlike router 16, decrement a time-to-live (TTL) value (again, not shown) for the L3 packet.

Figure 3:
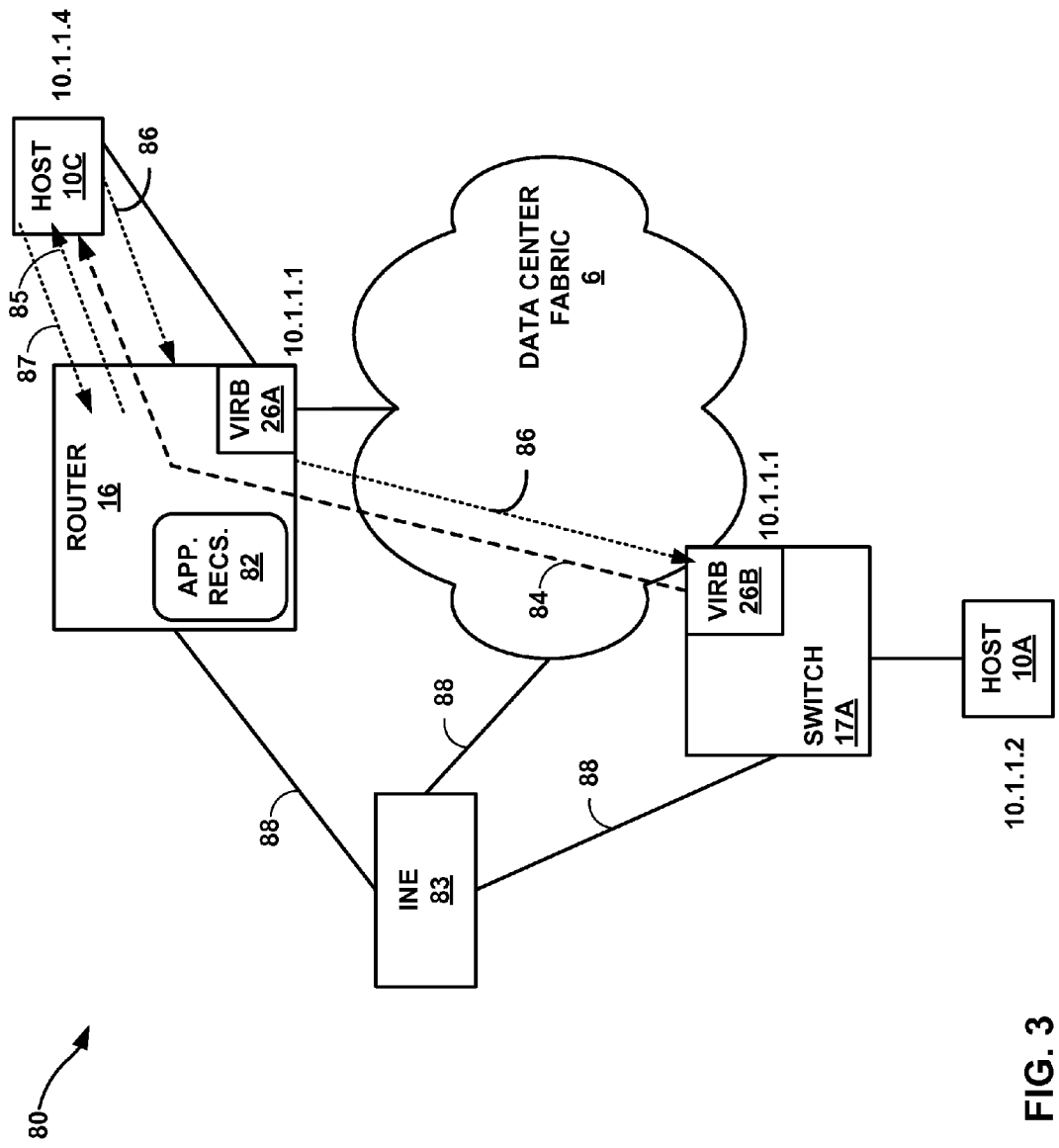
FIG. 3 is a block diagram illustrating an example network system in which multiple network devices that are each local to a distributed network subnet use application records to track application request messages and, based on the application records, forward application reply messages to respective network devices that issued the corresponding application request messages according to techniques described in this disclosure.

FIG. 3 is a block diagram illustrating an example network system in which multiple network devices that are each local to a distributed network subnet use application records to track application request messages and, based on the application records, forward application reply messages to respective network devices that issued the corresponding application request messages according to techniques described in this disclosure. Example network system 80 includes elements of network system 2 of FIG. 1. Switches 17 and router 16 execute one or more applications that direct application-layer (layer seven (L7)) communications to hosts 10 that are members of a distributed network subnet for which VIRBs 26 present a routing interface. Executed applications may include, e.g., ping and traceroute.

In the illustrated example, switch 17A executes an application to send application request message 84 (e.g., an ICMP echo request message) to the network address of host 10C, 10.1.1.4. Because the network address host of 10C is a member of the distributed network subnet of VIRBs 26, switch 17A may bridge the application request message 84 by the shared L2 VLAN of data center fabric 6. Router 16 receives application request message 84 on the shared L2 VLAN stitched to VIRB 26A. In addition, router 17 executes an application to generate a separate application request message 85 (e.g., an ICMP echo request message) to the network address of host 10C, 10.1.1.4.

In accordance with techniques described herein, router 16 stores a key for application request message 85 originated by router 16 to application records 82 ("app. recs. 82"). Router 16 stores a key for each received application request message destined for a host connected to VIRB 26A. Each of application records 82 uniquely identifies a pending application request message initiated by router 16 over a time period (ascending sequence numbers for application messages may roll over). Application records 82 for ping request messages, e.g., may each have a key including a source and destination address for the ping request message together with the ping identifier ("ID") and sequence number. Application records 82 for traceroute request messages, e.g., may each have a key including a flow five-tuple for the traceroute request message, i.e., source/destination network address, source/destination port, and protocol. Upon storing the key for application request message 84, router 16 forwards application request message 85 to host 10C. Router 16 does not, in this example, store a key for application request message 84. Rather, router 16 forwards application request 84 to host 10C.

Host 10C replies to application request message 84 with application reply message 86 (e.g., an ICMP echo reply message) to the source of corresponding application request message 84, i.e., the network address of VIRB 26B, 10.1.1.1. Router 16 receives application reply message 86. Because the network address of VIRB 26A of router 16 is also the network address of 26B, router 16 queries application records 82 to determine whether router 16 issued application request message 84 corresponding to application reply message 86. Specifically, router 16 compares key values of application reply message 86 to key values of application records 82. Router 16 may reverse the source and destination network address key value of application reply message 86 in order to compare the source network address of application reply message 86 with the destination network address of application request keys message 84 and to compare the destination network address of application reply message 86 with the source network address of application request keys. Router 16 may similarly reverse other "paired" key values for application request/ reply messages, such as source/destination ports. Because a matching application record is not present in application records 82 for application reply message 86, router 16 did not issue application request message 84 and therefore floods application reply message 86 to switches 17 including switch 17A.

Host 10C replies to application request message 85 with application reply message 87. Router 16 receives application reply message 87 and, as with application reply message 86, compares key values of application reply message 87 to key values of application records 82. Because a matching application record is present in application records 82 for application reply message 87, router 16 issued corresponding application request message 85 and therefore processes application reply message 86 to obtain and use the application information therein. Router 16 may then delete the matching application record from application records 82. Similarly, if router 16 issues an application request message to host 10A, switch 17A will receive the corresponding application reply message, not find a matching application record locally, and therefore forward the packet to switch 17B and router 16.

Example network system 80 additionally includes independent network element (INE) 83 connected to router 16, data center fabric 6, and switch 17A on a control VLAN 88 dedicated to control plane traffic. Frames associated with control VLAN 88 may in some instances be bridged by a dedicated one or more control plane switches (not shown). Although described with respect to router 16, the techniques of this disclosure may be performed by any of INE 83 and switch 17A. For example, router 16 may in some instances issue an application request message toward INE 83 or switch 17A, which store a key for the application request message in an application record of an application records data structure similar to application records 82 of router 16. INE 83 or switch 17A may receive a corresponding application reply message, match the application reply message to the application record, and forward the application reply message to router 16.

In some instances, network system 80 includes a plurality of INEs 83. Because matching application reply messages may be flooded in order to reach the corresponding issuing network device (e.g., switch 17A, another of INEs 83, or router 16), the flooded messages should not be re-flooded back to the flooder. In some instances, the flooding network device encapsulates application reply messages to render them distinct from "direct" application reply messages. The receiving network devices do not re-flood the decapsulated reply in a flat flooding tree or flood the decapsulated reply only to children in hierarchical flooding.

FIG. 4 is an example data structure of a network device that stores application records for matching application request/reply exchanges in accordance with techniques described in this disclosure. Table 90 may represent an example instance of a data structure for storing and accessing application records 82 of FIG. 3. Application records 82A-82N each specify an application type 92A and values 92B. Values 92B stores key values for an application request/reply exchange according to the corresponding application type 92A for the application record. For example, application record 82A specifies a ping application type. Key values in values 92B for application record 82A therefore include, in this example, the source ("SRC") and destination ("DST") network addresses, the ICMP echo request identifier ("ID"), and the ICMP echo request sequence number ("SQN"). As another example, application record 82C specifies a traceroute ("tracert") application type. Key values in values 92B for application record 82C therefore include, in this example, the packet flow five-tuple consisting of the source ("SRC") and destination ("DST") network addresses, the source ("SRC PORT") and destination ("DST PORT") ports, and the protocol ("PROTOCOL"). Router 16, for instance, matches application reply messages to application records 82 to determine whether router 16 originated and should therefore process the corresponding application response message or, alternatively, whether router 16 should flood the application reply to other network devices participating in co-ownership of a distributed network subnet.

Figure 5:
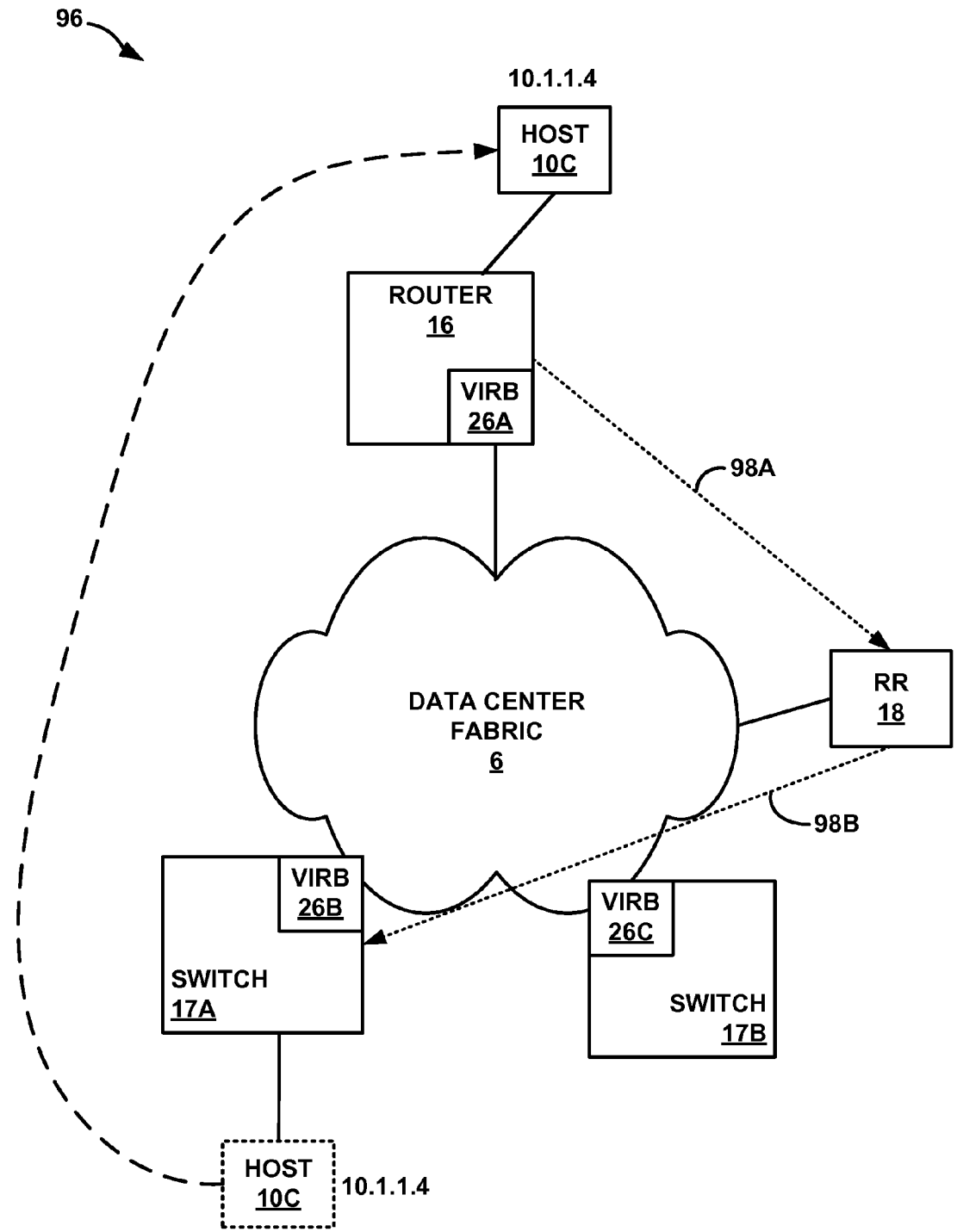
FIG. 5 is a block diagram illustrating an example system that supports virtual machine migration in accordance with techniques of this disclosure.

FIG. 5 is a block diagram illustrating an example system that supports virtual machine migration in accordance with techniques of this disclosure. Host 10C in FIG. 4 represents a virtual machine executing on a server. Initially, host 10C is situated behind switch 17A. As described above with respect to FIG. 1, switch 17A receives an ARP reply in response to an ARP request that includes a MAC address for host 10C having network address 10.1.1.4. In this example, switch 17A provides an ARP update including an ARP entry for host 10C to route reflector (RR) 18. The ARP update may include an identifier for the L2-domain and the MAC address of the IP-host binding. Route reflector 18 reflects the ARP update to router 16, for instance, with the L3/L2 information binding to enable router 16 to track MAC movement for ARP.

Host 10C subsequently migrates to a server situated behind router 16, such that host 10C is now local to router 16 rather than switch 17A (host 10C behind switch 17A is illustrated in a dashed outline to indicate migration). Router 16 learns host 10C is located on a local L2 interface of VIRB 26A, e.g., by an L2 address learning process such as L2ALM/L2ALD, and compares the MAC address of host 10C with all MAC associated with ARP entries learned via ARP updates from route reflector 18. Because, in this case, there is a matching ARP entry and the matching ARP entry does not point to a remote port, this indicates a virtual machine migration of host 10C and router 16 now has the egress port for this <IP, MAC> binding. Consequently, router 16 generates and sends a gratuitous ARP for the ARP entry that is received by a routing protocol process of router 16. Router 16 sends an update route message 98A that includes the new binding to route reflector 18, which reflects the update to switch 17A as update route message 98B. Update route messages 98A, 98B may represent BGP UPDATE messages, for instance. Switch 17A and router 16 therefore, despite operating as independent co-owners of the distributed network subnet associated with VIRBs 26, receive and install up-to-date L3/L2 information that enables virtual machine migration that is transparent to the virtual machine (e.g., host 10C).

In some cases, host 10C may migrate from switch 17A to switch 17B. In such cases, switch 17B performs the MAC movement detection and L2 and ARP route exchanges described above as being performed by router 16.

In some instances, router 16 serves as a gateway for multiple data centers each having a respective data center fabric similar to data center fabric 6. One or more of these multiple data center fabrics may belong to one of a plurality of customers of the router 16 provider. In such instances, router 16 may apply policies to MAC addresses learned locally at the data centers to prevent MAC addresses provided to router 16 by a data center fabric of one customer from leaking to a data center fabric of another customer. For example, MAC addresses may each be associated with a domain name that defines a data center fabric for a particular customer that provides the MAC address to router 16. Router 16 then applies policies to domain names associated with MAC addresses to ensure that only same-domain MAC address are permitted to exchange, by update route messages issued by router 16, between data center fabrics that belong to the same customer.

In some instances, switches 17 and/or router 16 may associate one or more properties with received MAC addresses that define a respective type of resource to which the MAC addresses are bound. Associated properties may include a server type, e.g., storage array, public server, and private server. Router 16 may then filter all MAC addresses received that do not have a property that defines the MAC addresses as a public server, for router 16 serves as a gateway for data center fabric 6 to the WAN for public servers. That is, router 16 may only store, to a switching table, MAC addresses that router 16 receives in association with a property that defines a public server. By contrast, storage arrays and private server may not be material to the gateway-related operation of router 16. These techniques may reduce a number of MAC addresses stored by router 16 and thus reduce an amount of memory of router 16 needed for MAC storage.

Figure 6:
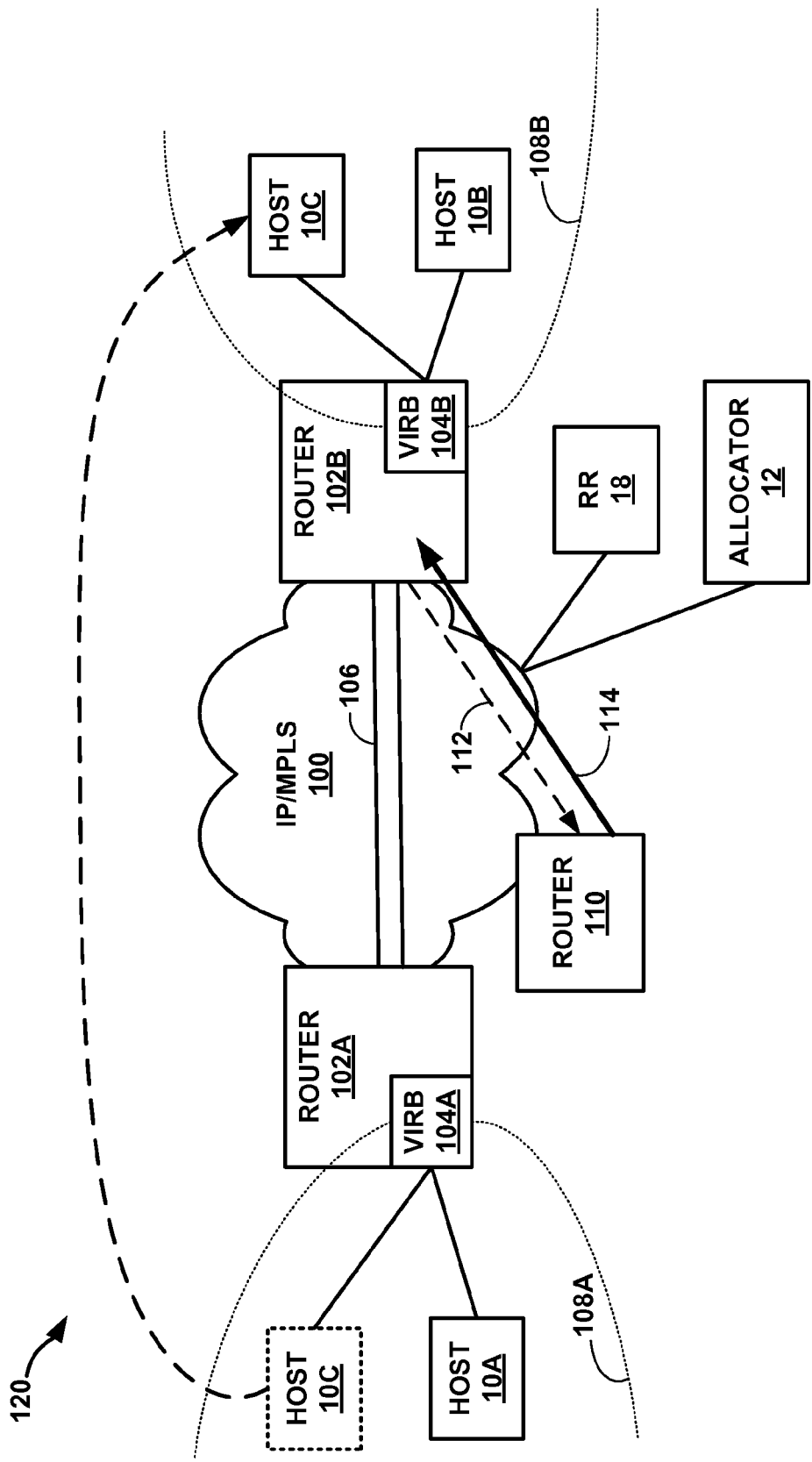
FIG. 6 is a block diagram illustrating an example network system in which independent network devices facilitate a distributed network subnet in accordance with techniques described in this disclosure.

FIG. 6 is a block diagram illustrating an example network system in which independent network devices facilitate a distributed network subnet in accordance with techniques described in this disclosure. In this example, network system 120 includes routers 102A, 102B (collectively, "routers 102") of IP/MPLS network 100 (illustrated as "IP/MPLS 100") having independent control planes that cooperatively manage a distribute network subnet. Routers 102 are independent routers, i.e., are not active/standby routers for a single routing node. Rather, routers 102 have independent control planes that independently L3 forwards packets and bridges frames for a single distributed network subnet, which is illustrated as sub-domain 108A behind router 102A and sub-domain 108B behind router 102B.

IP/MPLS network 100 may represent a WAN and, in this example, implements Multiprotocol Label Switching (MPLS) to establish an L2 instance 106 linking routers 102A, 102B. L2 instance 106 may link routers 102A, 102B using a Virtual Private LAN Service (VPLS) instance or other L2 instance. L2 instance 106 may include a bidirectional label switched path to carry a pseudowire. Example details regarding VPLS are found in U.S. patent application Ser. No. 13/156,214, filed Jun. 8, 2011 and entitled, "SYNCHRONIZING VPLS GATEWAY MAC ADDRESSES," the entire contents being incorporated by reference herein.

Respective configuration data for router 102 define respective VIRBs 104A, 104B (collectively, "VIRBs 104") and stitch together VIRBs 104 in the control planes with LSP 106. Accordingly, frames from IP/MPLS network 100 with the L2 instance 106 context flow through router 102 to respective sub-domains 108A, 108B. Thus, the operations of router 104A correspond to those of router 16 while the operations of router 104B may correspond to those of switch 17A of FIGS. 1-5. Similarly, the L2 instance of LSP 106 may correspond to the shared L2 VLAN described with respect to FIGS. 1-5. Allocator 12 may allocate and distribute a shared VIRB MAC address for VIRBs 104A, 104B to each of routers 102A, 102B; alternatively, the VIRB MAC may be pre-provisioned.

In addition, routers 102 may each include configuration data defining a L3 routing instance that include L3 interfaces for respective VIRBs 104. As described above with respect to FIG. 1, the routing instance may be shared with another L3 routing instance for IP/MPLS network 100. The L3 routing instance for IP/MPLS network 100 may include a shared L3 VLAN. Routers 102 stitch together the local routing instance for respective sub-domains 108A, 108B at layer three using the shared L3 VLAN such that L3 packets from IP/MPLS 100 with the context for the L3 routing instance for IP/MPLS network 100 flow through routers 102 to hosts 10 in respective sub-domains 108A, 108B.

In this way, routers 102 extend the L2 bridge domain and L3 routing domain associated with respective VIRBs 104 to respective sub-domains 108A, 108B that are local to routers 102. As a result, frames bridged and packets forwarded by routers 102 can reach hosts 10 behind any of routers 102.

Because the network subnet associated with VIRBs 104 is distributed, each of routers 102 co-owns the distributed network subnet. Routers 102 originating respective ARP requests or corresponding ARP replies may distribute the ARP requests/replies by RR 18 to the other one of routers 102. Routers 102 may exchange ARP communications using Border Gateway Protocol (BGP), for instance. Routers 102 forward packets to destinations in accordance with techniques described above with respect to router 16 of FIGS. 1-5.

In the illustrated example, routers 102 designate router 102B to advertise the distributed network subnet for VIRBs 104. Router 102B sends route advertisement 112 specifying the distributed network subnet (e.g., 10.1.1/24) as reachable by router 102B, though some of hosts 10 having network addresses within the distributed network subnet may be situated within sub-domain 108A behind router 102A. Consequently L3 traffic, such as L3 traffic 114 from router 110 of IP/MPLS network 100 flows toward router 102B.

In some examples, routers 102 may each advertise the distributed network subnet for VIRBs 104 to router 110 for, e.g., bandwidth optimization or fault-tolerance. Router 110 may form an equal-cost multipath (ECMP) with routers 102 and spray L3 traffic among routers 102. Following ARP exchanges via RR 18 for hosts 10 behind routers 102, router 110 may forward L3 traffic for a destination host, e.g., host 10A, to the one of routers 102 that is closest to the destination host.

Routers 102 may perform application request/reply exchanges in the manner described above with respect to FIGS. 3-4. Routers 102 may handle virtual machine migration in the manner described above with respect to FIGS. 1, 5, as illustrated by the migration of host 10C.

Figure 7:
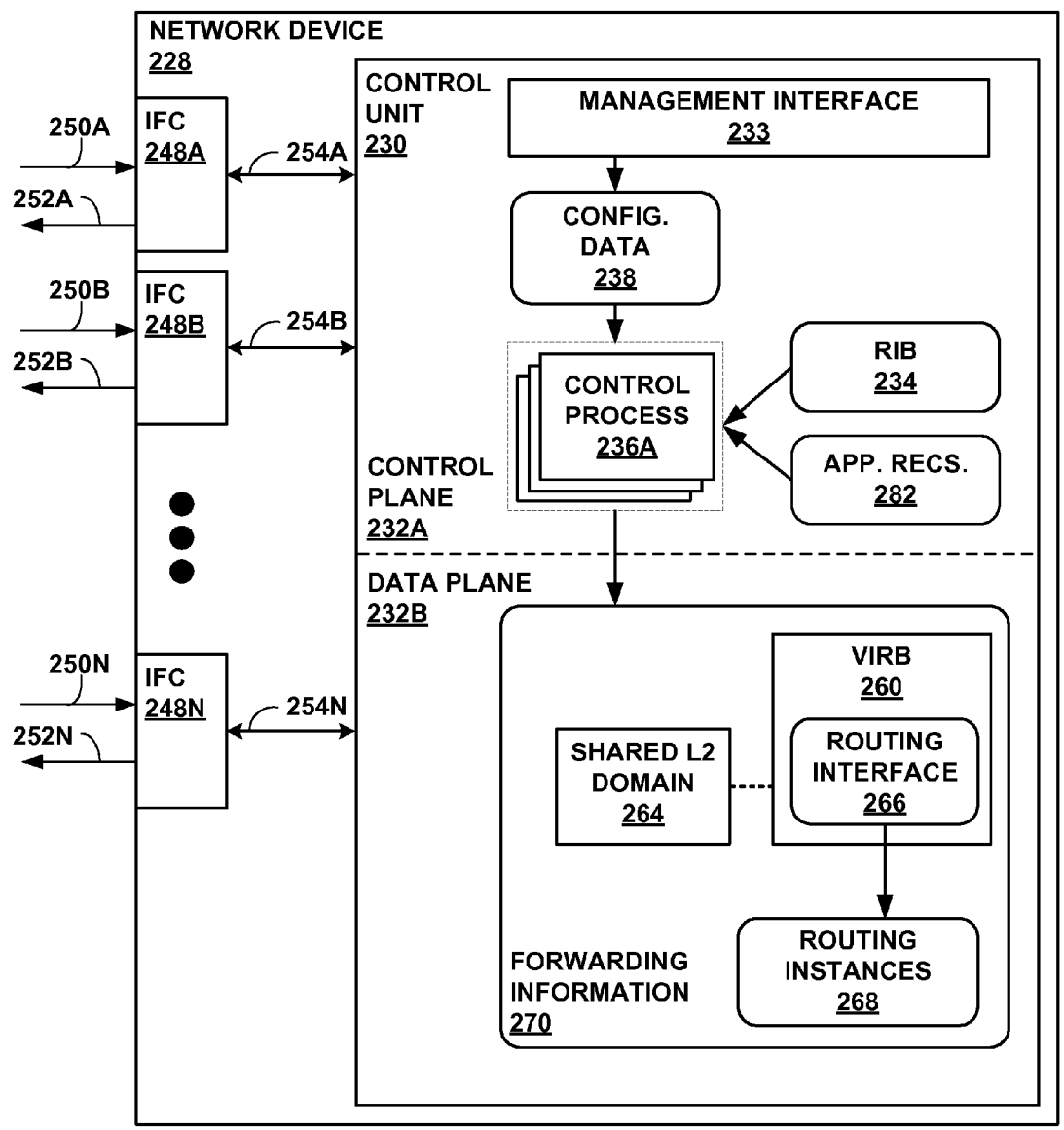
FIG. 7 is a block diagram illustrating an example network device that manages a distributed network subnet according to techniques described in this disclosure.

FIG. 7 is a block diagram illustrating an example network device that manages a distributed network subnet according to techniques described in this disclosure. For purposes of illustration, network device 228 may be described below within the context of network system 2 of FIG. 1, network system 80 of FIG. 3, network system 96 of FIG. 5, and network system 120 of FIG. 6, and network device 228 may represent any of router 16, routers 102, and switches 17. Moreover, while described with respect to a particular network device, e.g., a router or a switch, the techniques may be implemented by any network device that may operate perform L3/L2 forwarding. The techniques should therefore not be limited to the exemplary embodiments described in this disclosure.

Network device 228 includes a control unit 230 and interface cards 248A-248N ("IFCs 48") coupled to control unit 230 via internal links 254A-254N. Control unit 230 may comprise one or more processors (not shown in FIG. 7) that execute software instructions, such as those used to define a software or computer program, stored to a computer-readable storage medium (again, not shown in FIG. 7), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 230 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 230 is divided into two logical or physical "planes" to include a first control or routing plane 232A ("control plane 232A") and a second data or forwarding plane 232B ("data plane 232B"). That is, control unit 30 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 232A of control unit 230 executes the routing functionality of network device 228. Control processes 236A-236N (collectively, "control processes 236") of control plane 232A represent hardware or a combination or hardware and software that implement control plane functionalities. Thus, operations described as being performed in this disclosure by control processes 236 may be allocated and performed by a plurality of distinct processes, such as chassis configuration processes, management processes, and routing protocol processes. Control processes 236 may each represent, for instance, a daemon or a kernel module. Control process 236A may represent a routing protocol process of control plane 232A that implements routing protocols by which routing information stored in routing information base 234 ("RIB 234") may be determined. RIB 234 may include information defining a topology of a network. Control plane 232A may resolve the topology defined by routing information in RIB 234 to select or determine one or more routes through the network. Control plane 232A may then update data plane 232B with these routes, where data plane 232B maintains these routes as forwarding information 270.

Forwarding or data plane 232B represents hardware or a combination of hardware and software of control unit 30 that forwards network traffic in accordance with forwarding information 270. RIB 234 may in some aspects comprise one or more routing instances implemented by network device 228, with each instance including a separate routing table and other routing information. A routing protocol process of control processes 236 in such aspects updates forwarding information 270 with forwarding information for each of routing instances 268. In this respect, routing instance 268 each include separate forwarding information for use by data plane 232B in forwarding traffic in accordance with the corresponding routing instance.

Control plane 232A further includes management interface 233 by which a network management system or in some instances an administrator using a command line or graphical user interface, configures in network device 228 a virtual integrated routing and bridging instance (VIRB) 260 having routing interface 266 in one of routing instances 268. Routing interface 266 is a routing interface for a distributed network subnet co-owned by network device 228 with one or more additional network devices. VIRB 260 may represent any of VIRBs 26 of FIGS. 1, 3, and 7 or VIRBs 104 of FIG. 6.

Data plane 232B includes one or more forwarding units, such as packet forwarding engines ("PFEs"), which provide high-speed forwarding of network traffic received by interface cards 248 via inbound links 250A-250N to outbound links 252A-252N. VIRB 260 L2 bridges and L3 forwards traffic. An administrator, via management interface 233, may configure VIRB interface 260 via management interface 233 to include an L2 instance shared with shared L2 domain 264 and to map routing interface 266 of VIRB 260 to one of routing instances 268 for network device 228. Routing interface 266 may represent a next hop or other reference of a logical interface (IFL) of VIRB interface 260, for example. In some embodiments, aspects of data plane 232B are distributed to a number of distributed forwarding units, such as PFEs, each associated with a different one or more IFCs 248. In these embodiments, VIRB 260 may be distributed to the distributed forwarding units to enable high-speed integrated routing and bridging within the data plane.

VIRB 260 represents components of data plane 232B to implement the functionality provided by the interfaces. That is, VIRB 260 represents hardware or a combination of hardware and software to implement L2 switching for the associated L2 instance as well as for performing integrated routing and bridging according to techniques of this disclosure. VIRB 260 may include an L2 switching table, such as a MAC table (not shown).

Control processes 236 may receive a VIRB MAC address published by a central allocator and install the VIRB MAC address to forwarding information 270 to function as a gateway MAC address for VIRB 260. Control processes 236 may receive the VIRB MAC address in a message conforming to any suitable protocol, such as via RPC. Control processes 236 may receive the VIRB MAC address in response to a request sent by control processes 236 as indicated by configuration data 238 specifying a shared L2 domain 264 and, consequently, a distributed network subnet for VIRB 260.

VIRB 260 classifies L2 frames received on interfaces associated with the VIRB 260 bridging domain and destined for the VIRB MAC address as L3 packets for routing using the one of routing instances 268 mapped to routing interface 266. In other words, when network device 228 receives an L2 frame on a VIRB 260 interface, VIRB 260 determines the destination MAC address of the L2 frame. When the destination MAC address matches the VIRB MAC addresses of VIRB 260 mapped to routing interface 266, VIRB 260 classifies the L2 frame as an L3 packet and provides the L2 frame to the mapped one of routing instances 268 for L3 forwarding by data plane 232B. When a destination MAC address of an L2 frame does not match the VIRB MAC address, VIRB 260 bridges the L2 frame.

Control processes 236 may handle application request/reply exchanges for network device 228. Control processes 236, upon receiving an application request directed to a destination address within a distributed network subnet associated with VIRB 260, may store a key for the application request in application records 282, as described above with respect to FIGS. 3-4. Application records 282 may represent an example instance of applications records 82 of FIGS. 3-4. When control processes 236 receive an application reply, control processes 236 may attempt to match the key for the application reply to a key in application records 282 for a corresponding application request. If a match is found, control processes 236 may flood the application reply to other network devices that co-own the distributed network subnet. Control processes 236 may send the application reply by a route reflector.

Control processes 236 may also send ARP updates for migrated MAC addresses to other network devices that co-own the distributed network subnet to enable seamless forwarding for migrating hosts (e.g., virtual machine migration). Control processes 236 may send the ARP updates by a route reflector.

Figure 8:
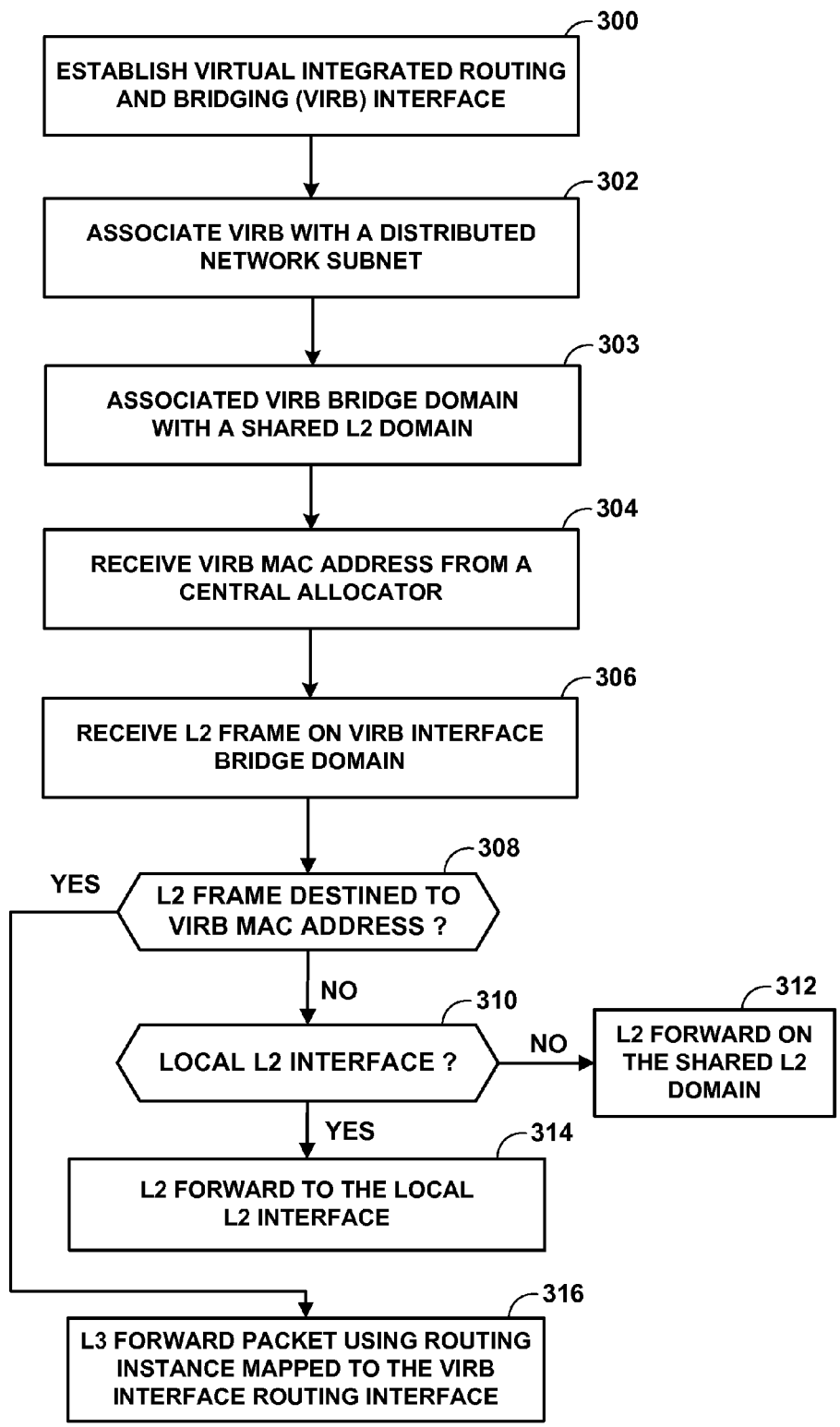
FIG. 8 is a flowchart illustrating an example mode of operation of a network device that performs L2/L3 forwarding for a distributed network subnet according to techniques described herein.

FIG. 8 is a flowchart illustrating an example mode of operation of a network device that performs L2/L3 forwarding for a distributed network subnet according to techniques described herein. For illustrative purposes, the example mode of operation is described with respect to network device 228 of FIG. 7. An administrator configures, by management interface 233, network device 228 by modifying configuration data 238 to include configuration of a virtual integrated routing and bridging (VIRB) interface 260 (300). VIRB 260 is configured to include a routing interface 266 associated with a distributed network subnet (302) and to include a bridging domain associated with a shared L2 domain (303).

Rather than drawing from a local MAC pool, control processes 236 of control plane 232A of network device 228 receive, from a central allocator, a gateway MAC address for VIRB 260 (a "VIRB MAC address") (304). The VIRB MAC address is shared among a plurality of VIRBs configured in a plurality of network devices that co-own the distributed network subnet associated with the routing interface of VIRB 260.

Data plane 232B receives an L2 frame on one of inbound links having an L2 interface in the bridging domain of VIRB 260 (306). If the L2 frame has a destination MAC address that is the VIRB MAC address (YES branch of 308), data plane 232B L3 forwards the L2 frame using one of routing instances 268 mapped to routing interface 266 of VIRB 260 (316). Otherwise (NO branch of 308), if the L2 frame is destined for a local L2 interface of network device 228 (YES branch of 310), data plane 232B bridges the L2 frame on the local L2 interface. If the L2 frame is destined for a non-local L2 interface of network device 228 (NO branch of 310), data plane 232B bridges the L2 frame on the shared L2 domain stitched to the bridge domain of VIRB 260 (312).

Figure 9:
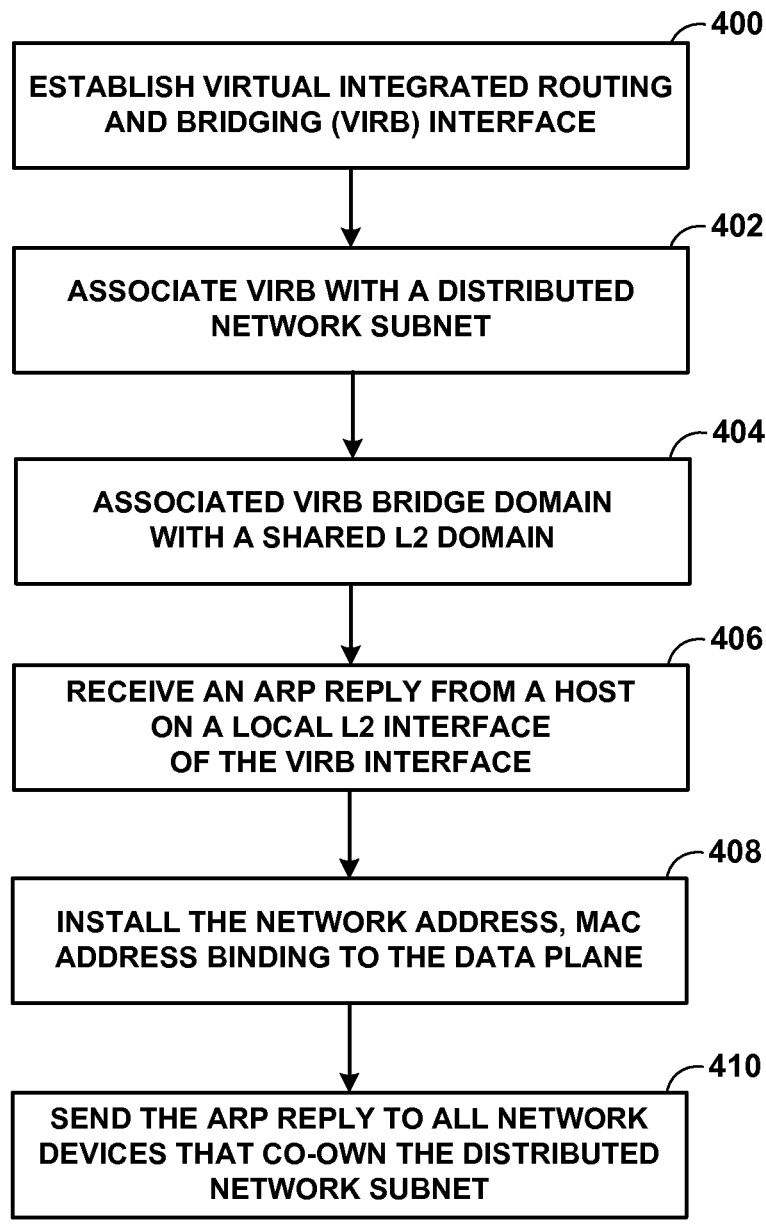
FIG. 9 is a flowchart illustrating an example mode of operation of a network device that performs L2/L3 forwarding and forwards ARP replies for a distributed network subnet according to techniques described herein.

FIG. 9 is a flowchart illustrating an example mode of operation of a network device that performs L2/L3 forwarding and forwards ARP replies for a distributed network subnet according to techniques described herein. For illustrative purposes, the example mode of operation is described with respect to network device 228 of FIG. 7. An administrator configures, by management interface 233, network device 228 by modifying configuration data 238 to include configuration of a virtual integrated routing and bridging (VIRB) interface 260 (400). VIRB 260 is configured to include a routing interface 266 associated with a distributed network subnet (402) and to include a bridging domain associated with a shared L2 domain (404).

Control processes 236 receive, by one of inbound links 250 and from a host located on a L2 interface of VIRB 260, an ARP reply for a network address that is within the distributed network subnet associated with routing interface 266 (406). Control processes 236 install, to forwarding information 270, the network address and MAC address included within the ARP reply and bind the network address, MAC address combination to an interface (408). In addition, control processes 236 send the ARP reply to all other network devices that co-own the distributed network subnet (410). Control processes 236 may send the ARP reply by a route reflector.

Figure 10:
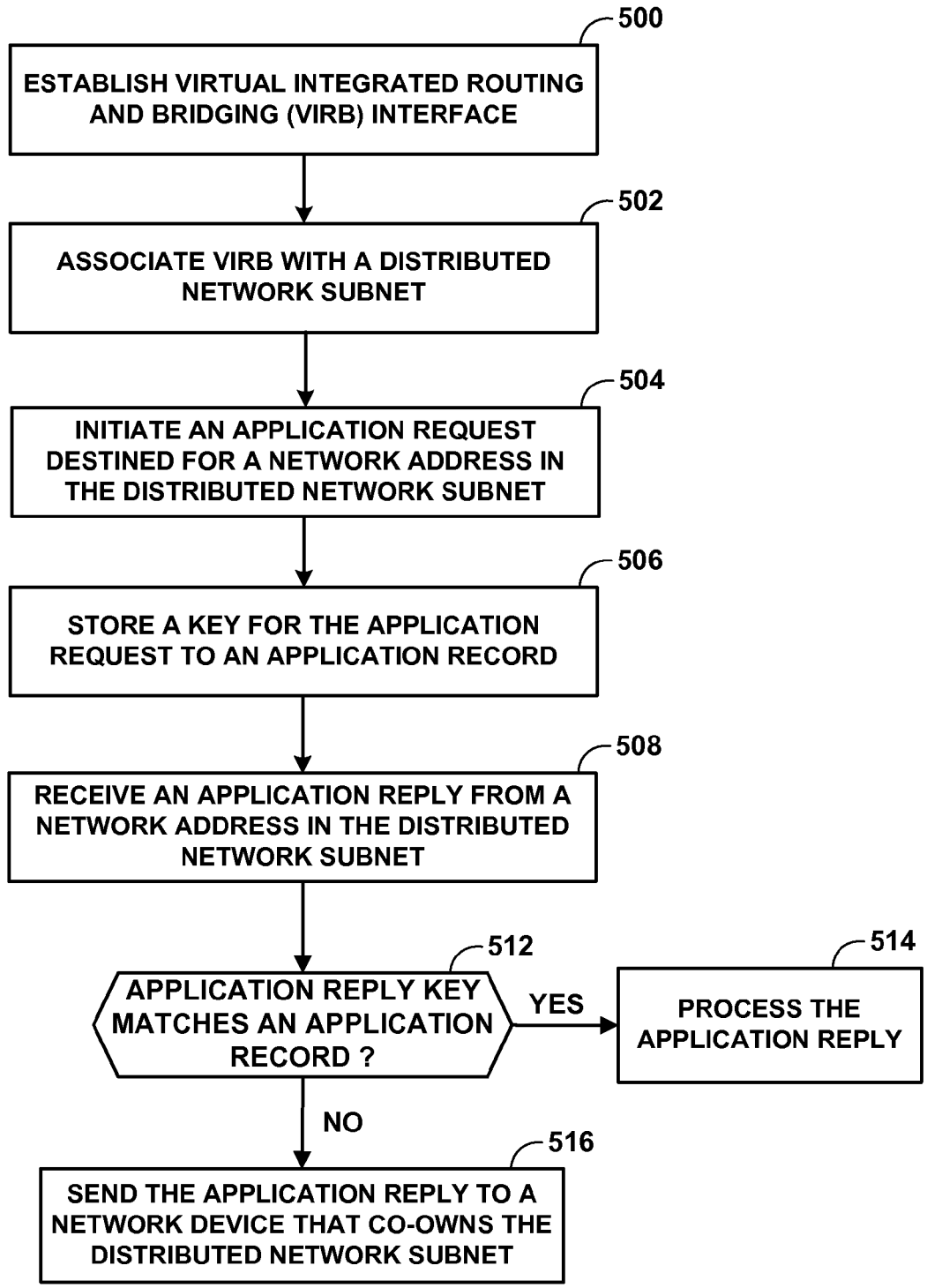
FIG. 10 is a flowchart illustrating an example mode of operation of a network device that performs L2/L3 forwarding and handles application request/reply exchanges for a distributed network subnet according to techniques described herein.

FIG. 10 is a flowchart illustrating an example mode of operation of a network device that performs L2/L3 forwarding and handles application request/reply exchanges for a distributed network subnet according to techniques described herein. For illustrative purposes, the example mode of operation is described with respect to network device 228 of FIG. 7. An administrator configures, by management interface 233, network device 228 by modifying configuration data 238 to include configuration of a virtual integrated routing and bridging (VIRB) interface 260 (500). VIRB 260 is configured to include a routing interface 266 associated with a distributed network subnet (502).

Control processes 236 generate an application request that is destined for a network address in the distributed network subnet associated with routing interface 266 (504). The application request may include, e.g., an ICMP echo request. Control processes 236 generate, according to values of the application request, and store a key for the application request to an application record in application records 282 (506).

Subsequently, control processes 236 receive, by one of inbound links 250, an application reply that is sourced by a network address in the distributed network subnet associated with routing interface 266 (508). Control processes 236 generate a corresponding application reply key for the application reply and query application records 282 using the application reply key (512). If the application reply key matches any of application records 282 (YES branch of 512), control processes 236 initiate the corresponding application request for the application reply and therefore process the application reply (516). If the application reply key does not match any of application records 282, however (NO branch of 512), control processes 236 send the application reply to one or more network devices that co-own the distributed network subnet associated with routing interface 266 of VIRB 260 (516). In this way, control process 236 may ensure that the application reply reaches the issuing control plane for one of the network devices.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising: establishing, within a first network device, a first virtual integrated routing and bridging (VIRB) interface that comprises a first routing interface for a first layer two (L2) bridge domain that provides L2 connectivity for a first network local to the first network device, wherein the first routing interface is associated with a network subnet for the first network; establishing, within a second network device, a second VIRB interface that comprises a second routing interface for a second L2 bridge domain that provides L2 connectivity for a second network local to the second network device, wherein the second routing interface is associated with a network subnet for the second network, wherein the first network is not local to the second network device and the second network is not local to the first network device, wherein the network subnet for the first network and the network subnet for the second network comprise a distributed network subnet in which the network subnet for the first network and the network subnet for the second network comprise a common network subnet, and wherein the first VIRB interface and the second VIRB interface have a common gateway MAC address that identifies routable L2 traffic received by the first VIRB interface from the first L2 bridge domain or received by the second VIRB interface from the second L2 bridge domain; receiving first L2 traffic with the first network device from the first L2 bridge domain and forwarding L3 traffic encapsulated by the first L2 traffic by the first routing interface when the first L2 traffic is destined for the common gateway MAC address; and receiving second L2 traffic with the second network device from the second L2 bridge domain and forwarding L3 traffic encapsulated by the second L2 traffic by the second routing interface when the second L2 traffic is destined for the common gateway MAC address.

2. The method of claim 1, further comprising: receiving third L2 traffic from a host device with the first network device from the first L2 bridge domain and forwarding L3 traffic encapsulated by the third L2 traffic by the second routing interface when the third L2 traffic is destined for the common gateway MAC address; migrating the host device from the first network to the second network without modifying any of a network address of the host device, a default gateway network address for the host device, or a gateway MAC address for the host device, wherein the network address of the host device is a member of the common network subnet; receiving fourth L2 traffic from the host device with the second network device from the second L2 bridge domain and forwarding L3 traffic encapsulated by the fourth L2 traffic by the second routing interface when the fourth L2 traffic is destined for the common gateway MAC address.

3. The method of claim 1, further comprising: receiving, with the first network device, a VIRB MAC message comprising a VIRB MAC address from a central allocator and installing the VIRB MAC address as a gateway MAC address for the first VIRB interface; and receiving, with the second network device, a VIRB MAC message comprising the VIRB MAC address from the central allocator and installing the VIRB MAC address as a gateway MAC address for the second VIRB interface.

4. The method of claim 1, wherein a shared L2 network connects the first network device and the second network device, the method further comprising: stitching, with the first network device, an L2 interface connected to the shared L2 network to the first VIRB interface to cause the first network device to bridge L2 frames received at the L2 interface to the first L2 bridge domain.

5. The method of claim 1, further comprising: receiving, with the first network device, a layer three (L3) packet having a destination network address that is a member of the distributed network subnet for the first network; generating, with the first network device, an Address Resolution Protocol (ARP) request for the destination network address; forwarding the ARP request to each of one or more L2 interfaces of the first L2 bridge domain; and forwarding the ARP request from the first network device to the second network device.

6. The method of claim 1, further comprising: receiving, with the first network device, an Address Resolution Protocol (ARP) request for a destination network address that is a member of the distributed network subnet for the first network; forwarding the ARP request to one or more L2 interfaces of the first L2 bridge domain; receiving an ARP reply responsive to the ARP request; and forwarding the ARP reply from the first network device to the second network device.

7. The method of claim 6, wherein forwarding the ARP reply comprises forwarding the ARP reply to a route reflector.

8. The method of claim 6, wherein the ARP reply comprises a MAC address for a host device associated with the destination network address, the method further comprising: installing a route for the destination network address to the first network device, wherein the route binds the destination network address and the MAC address to one of the one or more L2 interfaces of the first L2 bridge domain.

9. The method of claim 1, further comprising: receiving, with the first network device, an Address Resolution Protocol (ARP) reply for a destination network address that is a member of the distributed network subnet for the first network, wherein the ARP reply comprises a MAC address; installing a route for the destination network address to the first network device, wherein the route binds the destination network address and the MAC address to an interface of the first network device that is associated with the second network device; receiving an L2 frame on a first one of the one or more L2 interfaces of the first L2 bridge domain; determining a source MAC address of the L2 frame matches the MAC address; modifying the route for the destination network address, wherein the modified route binds the destination network and the source MAC address to the first one of the one or more L2 interfaces of the first L2 bridge domain; and updating the second network device with the modified route.

10. The method of claim 9, wherein updating the second network device with the modified route comprises sending a gratuitous ARP from the first network device to the second network device.

11. The method of claim 9, wherein a communication link over a wide area network couples the first network device and the second network device, and where updating the second network device with the modified route comprises sending an update route message from the first network device to the second network device by the communication link to indicate a host device associated with the destination network address has migrated from the second L2 bridge domain across the wide area network to the first L2 bridge domain.

12. The method of claim 1, further comprising: generating a plurality of application requests with the first network device; storing a key for each of a plurality of application requests to a respective one of a plurality of application records; receiving an application reply with the first network device; comparing a key for the application reply to one or more keys stored to the plurality of application records; when the key for the application reply matches one of the one or more keys stored to the plurality of application records, processing the application reply with the first network device; and when the key for the application reply does not match any of the keys stored to the plurality of application records, forwarding the application reply to the second network device.

13. The method of claim 12, wherein the application request comprises an Internet Control Message Protocol echo request, and wherein the application reply comprises an Internet Control Message Protocol echo reply.

14. The method of claim 1, wherein the first network device comprises a router of an edge domain of a data center, and wherein the second network device comprises a switch of the data center.

15. The method of claim 1, wherein the first network device comprises a first switch of a data center, and wherein the second network device comprises a second switch of the data center.

16. The method of claim 1, wherein the second network device comprises a router of an edge domain of a data center, and wherein the first network device comprises a switch of the data center.

17. The method of claim 16, wherein the data center comprises a local data center for the router, the method further comprising: receiving, with the second network device, a MAC address for a host connected to the first network device; associating the MAC address with a domain name for the data center; determining, with the second network device, the domain name for the data center is a domain name for one or more data centers that are remote for the second network device; and sending, from the second network device, the MAC address only to the one or more data centers.

18. The method of claim 16, further comprising: receiving, with the second network device, a MAC address for a host connected to the first network device and a property for the MAC address; determining, with the second network device, the property for the MAC address; and storing, with the second network device, the MAC address for the host only when the property for the MAC address defines the host as a public server.

19. A network device comprising: a control unit comprising a processor; a virtual integrated routing and bridging (VIRB) interface of the control unit that comprises a routing interface for a layer two (L2) bridge domain that provides L2 connectivity for a network local to the network device, wherein the routing interface is associated with a distributed network subnet for the network; one or more control processes of the control unit to receive a VIRB MAC message comprising a VIRB MAC address from a central allocator and install the VIRB MAC address as a gateway MAC address for the VIRB interface, wherein the VIRB interface and a VIRB interface of a remote network device have a common gateway MAC address that identifies routable L2 traffic received by the VIRB interface from the L2 bridge domain, and wherein the network device and the remote network device co-own the distributed network subnet, wherein the VIRB interface receives L2 traffic from the L2 bridge domain and forwards L3 traffic encapsulated by the L2 traffic on the routing interface when the L2 traffic is destined for the common gateway MAC address.

20. The network device of claim 19, wherein a shared L2 network connects the network device and the remote network device, the network device further comprising: an L2 interface connected to the shared L2 network and stitched to the VIRB interface to cause the network device to bridge L2 frames received at the L2 interface to the L2 bridge domain.

21. The network device of claim 19, further comprising: a network interface to receive a layer three (L3) packet having a destination network address that is a member of the distributed network subnet for the network, wherein the control processes generate an Address Resolution Protocol (ARP) request for the destination network address, wherein the control processes forward the ARP request to each of one or more L2 interfaces of the L2 bridge domain, and wherein the control processes forward the ARP request from the network device to the remote network device.

22. The network device of claim 19, wherein the control processes receive an Address Resolution Protocol (ARP) request for a destination network address that is a member of the distributed network subnet for the network, wherein the control processes forward the ARP request to one or more L2 interfaces of the L2 bridge domain, wherein the control processes receive an ARP reply responsive to the ARP request, and wherein the control processes forward the ARP reply from the network device to the remote network device.

23. The network device of claim 22, wherein the control processes forward the ARP reply comprises by forwarding the ARP reply to a route reflector.

24. The network device of claim 22, further comprising: a data plane comprising forwarding information, wherein the ARP reply comprises a MAC address for a host device associated with the destination network address, wherein the control process installs a route for the destination network address to the forwarding information, wherein the route binds the destination network address and the MAC address to one of the one or more L2 interfaces of the L2 bridge domain.

25. The network device of claim 19, further comprising:
a data plane comprising forwarding information; wherein the control processes receive an Address Resolution Protocol (ARP) reply for a destination network address that is a member of the distributed network subnet for the network, wherein the ARP reply comprises a MAC address; wherein the control processes install a route for the destination network address to the forwarding information, wherein the route binds the destination network address and the MAC address to an interface of the network device that is associated with the remote network device, wherein the control processes receive an L2 frame on a first one of the one or more L2 interfaces of the L2 bridge domain, wherein the control processes determine a source MAC address of the L2 frame matches the MAC address, wherein the control processes modify the route for the destination network address, wherein the modified route binds the destination network and the source MAC address to the first one of the one or more L2 interfaces of the L2 bridge domain, and wherein the control processes update the remote network device with the modified route.

26. The network device of claim 25, wherein the control processes update the remote network device with the modified route by sending a gratuitous ARP to the remote network device.

27. The network device of claim 25, wherein a communication link over a wide area network couples the network device and the remote network device, and where the control processes update the remote network device with the modified route by sending an update route message from the network device to the remote network device by the communication link to indicate a host device associated with the destination network address has migrated across the wide area network to the L2 bridge domain.

28. The network device of claim 19, further comprising: a plurality of application records, wherein the control processes generate a plurality of application requests with the network device, wherein the control processes store a key for each of a plurality of application requests to a respective one of the plurality of application records, wherein the control processes receive an application reply, wherein the control processes compare a key for the application reply to one or more keys stored to the plurality of application records, wherein the control processes, when the key for the application reply matches one of the one or more keys stored to the plurality of application records, process the application reply, and wherein the control processes, when the key for the application reply does not match any of the keys stored to the plurality of application records, forwards the application reply to the remote network device.

29. The network device of claim 28, wherein the application request comprises an Internet Control Message Protocol echo request, and wherein the application reply comprises an Internet Control Message Protocol echo reply.

30. The network device of claim 19, wherein the network device comprises a switch of a data center.

31. The network device of claim 19, wherein the network device comprises a router of an edge domain of a data center.

32. The network device of claim 31, wherein the data center comprises a local data center for the network device, wherein the control processes receive a MAC address for a host, wherein the control processes associate the MAC address with a domain name for the data center, wherein the control processes determine the domain name for the data center is a domain name for one or more data centers that are remote for the network device, and wherein the control processes send the MAC address only to the one or more data centers.

33. The network device of claim 31, wherein the control processes receive a MAC address for a host and a property for the MAC address, wherein the control processes determine the property for the MAC address, and wherein the control processes store the MAC address for the host only when the property for the MAC address defines the host as a public server.

34. A non-transitory computer-readable medium comprising instructions for causing one or more programmable processors to: establish, with a network device, a virtual integrated routing and bridging (VIRB) interface that comprises a routing interface for a layer two (L2) bridge domain that provides L2 connectivity for a network local to the network device, wherein the routing interface is associated with a distributed network subnet for the network; receive a VIRB MAC message comprising a VIRB MAC address from a central allocator and install the VIRB MAC address as a gateway MAC address for the VIRB interface, wherein the VIRB interface and a VIRB interface of a remote network device have a common gateway MAC address that identifies routable L2 traffic received by the VIRB interface from the L2 bridge domain, and wherein the network device and the remote network device co-own the distributed network subnet; and receive L2 traffic with the network device from the L2 bridge domain and forward L3 traffic encapsulated by the L2 traffic on the routing interface when the L2 traffic is destined for the common gateway MAC address.

* * * * *